(12) United States Patent
Utsugi

(10) Patent No.: US 10,449,451 B2
(45) Date of Patent: Oct. 22, 2019

(54) VIDEO GAME WITH STEERING ASSIST THAT CONSIDERS PROXIMITY TO A COURSE EDGE

(71) Applicant: NINTENDO CO., LTD., Kyoto (JP)

(72) Inventor: Shun Utsugi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 119 days.

(21) Appl. No.: 15/690,671

(22) Filed: Aug. 30, 2017

(65) Prior Publication Data

US 2018/0104584 A1    Apr. 19, 2018

(30) Foreign Application Priority Data

Oct. 19, 2016 (JP) .................................. 2016-205475

(51) Int. Cl.
| | |
|---|---|
| *A63F 13/00* | (2014.01) |
| *A63F 13/428* | (2014.01) |
| *A63F 13/803* | (2014.01) |
| *A63F 13/422* | (2014.01) |
| *A63F 13/573* | (2014.01) |
| *A63F 13/47* | (2014.01) |
| *A63F 13/577* | (2014.01) |
| *A63F 13/211* | (2014.01) |

(Continued)

(52) U.S. Cl.
CPC .......... *A63F 13/428* (2014.09); *A63F 13/422* (2014.09); *A63F 13/47* (2014.09); *A63F 13/573* (2014.09); *A63F 13/577* (2014.09); *A63F 13/803* (2014.09); *A63F 13/211* (2014.09); *A63F 13/245* (2014.09); *G06F 3/0346* (2013.01); *G06F 3/0362* (2013.01)

(58) Field of Classification Search
CPC ...... A63F 13/245; A63F 13/422; A63F 13/56; A63F 13/803; A63F 2300/1062; A63F 2300/6045; A63F 2300/8017
See application file for complete search history.

(56) References Cited

U.S. PATENT DOCUMENTS

2007/0265087 A1* 11/2007 Akahori .................. A63F 13/10
                                                        463/37
2010/0323795 A1* 12/2010 Yamashita ............ A63F 13/803
                                                        463/36

FOREIGN PATENT DOCUMENTS

| JP | 2004-195002 | 7/2004 |
|---|---|---|
| JP | 2004-236799 | 8/2004 |

(Continued)

*Primary Examiner* — Lawrence S Galka
(74) *Attorney, Agent, or Firm* — NIxon & Vanderhye P.C.

(57) ABSTRACT

In an example game processing of moving a predetermined object in a predetermined course in a virtual space on the basis of an operation performed by a player, first, an input amount according to an input for controlling a moving direction of the predetermined object based on the operation performed by the player is obtained. Next, the input amount according to the input for controlling the moving direction is corrected so as to cause the moving direction of the predetermined object to be close to a direction along a travelling direction as a direction toward a destination, by increasing/decreasing a predetermined correction value which is added to the input amount, on the basis of relationship between a current moving direction of the predetermined object and the travelling direction of the course. Then, movement of the predetermined object is controlled on the basis of the corrected input amount.

5 Claims, 26 Drawing Sheets

(51) Int. Cl.
  *A63F 13/245* (2014.01)
  *G06F 3/0346* (2013.01)
  *G06F 3/0362* (2013.01)

(56) References Cited

FOREIGN PATENT DOCUMENTS

JP    2007-301040    11/2007
JP      2011-4798     1/2011

\* cited by examiner

F I G. 9
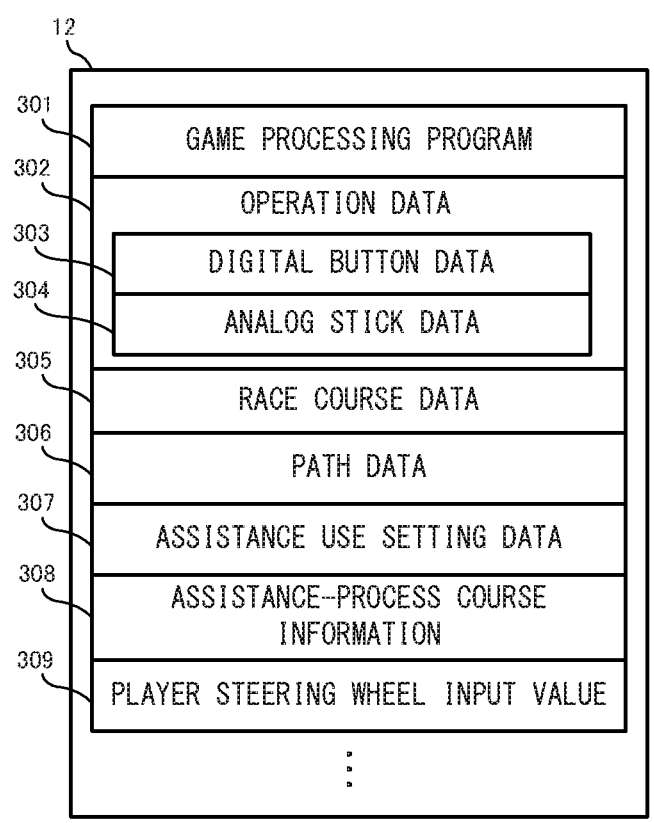

LINE CONNECTING CENTER POINTS

F I G. 3 4
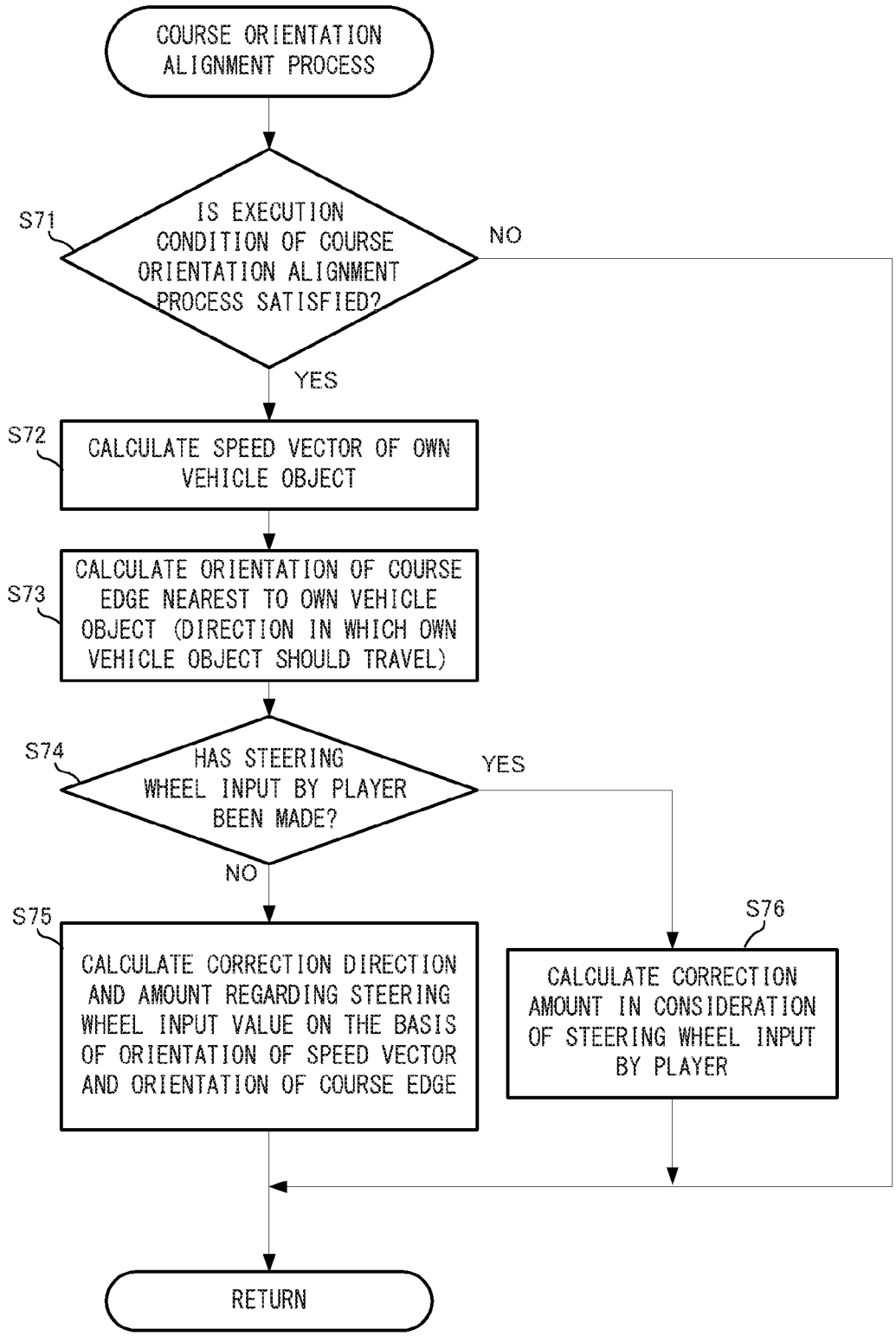

VIDEO GAME WITH STEERING ASSIST THAT CONSIDERS PROXIMITY TO A COURSE EDGE

CROSS REFERENCE TO RELATED APPLICATION

The disclosure of Japanese Patent Application No. 2016-205475, filed on Oct. 19, 2016, is incorporated herein by reference.

FIELD

The exemplary embodiment described herein relates to game processing, and in particular, relates to game processing for causing a predetermined object to move in a predetermined course in a virtual space on the basis of an operation of a player.

BACKGROUND AND SUMMARY

Conventionally, in race games, technologies are known in which game operations (driving operation) performed by a beginner player unskilled in game operations, especially, an accelerator operation and a brake operation each corresponding to a speed operation input, are automatically corrected to assist the driving operation.

For example, when a beginner's own vehicle turns a corner, the beginner tends to be concentrated on steering operation, and thus, become less concentrated on an accelerator operation or a brake operation. Thus, from this point of view, in the technologies as described above, the operation regarding the braking amount is corrected in such a manner as to prevent overspeed, whereby the speed of the own vehicle is corrected. However, such a technique of directly controlling the speed could allow the player to notice that the correction control has been performed. That is, the technique could give the player an uncomfortable feeling.

Therefore, an object of this exemplary embodiment is to provide a computer-readable non-transitory storage medium having stored therein a game program and the like that allow, while giving less uncomfortable feeling, even a beginner player to cause his/her own vehicle to travel along a course well, thereby allowing the player to enjoy the race game.

In order to achieve the above object, the following configuration examples are conceivable, for example.

One example of a configuration example is a computer-readable non-transitory storage medium having stored therein a game program to be executed by a computer of a game apparatus configured to perform game processing of moving, on the basis of an operation performed by a player, a predetermined object in a predetermined course in a virtual space, the game program causing the computer to perform: obtaining an input amount; performing correction control; and controlling movement of the predetermined object. In the obtaining of the input amount, an input amount according to an input for controlling a moving direction of the predetermined object based on the operation performed by the player is obtained. In the performing of the correction control, correction control of the input amount according to the input for controlling the moving direction is performed, so as to cause the moving direction of the predetermined object to be close to a direction along a travelling direction which is a direction toward a destination in the predetermined course, by increasing/decreasing a predetermined correction value which is added to the input amount, on the basis of relationship between a current moving direction of the predetermined object and the travelling direction of the course. In the controlling of the movement of the predetermined object, movement of the predetermined object in the virtual space is controlled on the basis of the corrected input amount according to the input for controlling the moving direction.

According to the above configuration example, in a race game, for example, even in a case of a player who is not good at a race game, it is possible to support steering operation by the player (input for controlling the moving direction), without giving the player an uncomfortable feeling, thereby being able to enhance the interest of the game.

As another configuration example, the game program may further cause the computer to perform obtaining edge data indicative of positions of both edges in a width direction axis of the course. In the performing of the correction control, the travelling direction of the course may be calculated on the basis of the edge data, and the correction value may be determined on the basis of relationship between the calculated travelling direction and the current moving direction of the predetermined object.

According to the above configuration example, correction based on the position of the edge of the course and the travelling direction of the course can be performed. For example, when off-course is likely to occur, strong correction is performed, whereby occurrence of the off-course can be prevented. When off-course is not likely to occur, weak correction that would not give the player an uncomfortable feeling is performed, whereby interest of the game can be enhanced.

As another configuration example, the game program may further cause the computer to perform obtaining, from a predetermined storage, path data including a plurality of pieces of information of paths each corresponding to a portion of the course and indicating that a corresponding path is a place capable of being traveled through, and width data indicative of a width of a traveling-allowed passage formed on the basis of the plurality of paths. In the obtaining of the edge data, the edge data may be obtained by calculating, on the basis of the path data and the width data, a position of an edge in the course in a predetermined range based on a position of the predetermined object used as a reference. The course may have a route that is branched in a middle portion thereof, the path data may include information of a branched path which is a path corresponding to a position on the course serving as a branch point. The game program may further cause the computer to perform selecting, when the predetermined object is present at the position on the course corresponding to the branched paths, one of the plurality of paths at a travelling direction side for the object, on the basis of the moving direction of the object at that time. In the obtaining of the edge data, the position of the edge may be calculated on the basis of the selected path. Further, at least a part of the route that is branched may be a route that becomes capable of being traveled through in a state where the predetermined object satisfies a predetermined condition. For example, only in a state where the predetermined object possesses a predetermined item, the branched route may emerge.

According to the above configuration example, for example, the configuration of the course in the surroundings of the player object can be ascertained in real time. Accordingly, for example, flexibly processing can be performed assuming a case where a hidden route suddenly emerges, etc., and a variety of gimmicks can be set depending on the race course, and thus, interest of the game can be enhanced.

As another configuration example, in the performing of the correction control, the correction value may be determined on the basis of a distance between the predetermined object and an edge, of both edges in the width direction axis of the course, that is nearer to the predetermined object. In the performing of the correction control, the correction value may be determined on the basis of an angle between the moving direction of the predetermined object and the travelling direction at an edge, of both edges in the width direction axis of the course, that is nearer to the predetermined object. In the performing of the correction control, the correction value may be determined on the basis of the input for controlling the moving direction of the predetermined object based on the operation performed by the player (for example, in consideration of a steering operation input), in addition to the relationship between the current moving direction of the predetermined object and the travelling direction. Further, the correction control may be performed when the predetermined object is present in a predetermined range from either one of both edges in a width direction axis of the course.

According to the above configuration example, it is possible to perform: a fine correction process that suits each state of the predetermined object; and a correction process in consideration of the edge of the course, such as performing stronger correction when the risk of off-course is higher, and performing weaker correction when the risk of off-course is lower, for example.

As another configuration example, the game program may further cause the computer to perform further applying, to the predetermined object, an acceleration toward an inner side direction of the course and in a direction perpendicular to the travelling direction according to an edge, of both edges in the width direction axis of the course, that is nearer to the predetermined object. In the controlling of the movement, the movement of the predetermined object may be controlled on the basis of the corrected input amount according to the input for controlling the moving direction and the applied acceleration. In the applying of the acceleration, a magnitude of the acceleration to be applied to the predetermined object may be determined in accordance with a distance between the predetermined object and the edge that is nearer to the predetermined object.

According to the above configuration example, since the movement of the predetermined object is further corrected in addition to the correction of the input amount according to the input for controlling the moving direction, prevention of the off-course, for example, can be effectively performed.

As another configuration example, the game processing may be a game program for a race, and the input for controlling the moving direction of the predetermined object may be an input generated through operation of a steering wheel.

According to the above configuration example, interest of the race game can be further enhanced.

As another configuration example, in the obtaining of the input amount, the input amount according to the input for controlling the moving direction of the predetermined object may be calculated on the basis of a value indicative of a motion made onto a controller, the controller having a motion sensor configured to detect a motion made onto the controller, the value being outputted from the controller.

According to the above configuration example, by moving the controller, the feeling as if actually operating the steering wheel can be enhanced, for example. At the same time, although the operation to be performed by the player tends to be difficult when the motion and attitude of the controller are used, correction realized by the above-described correction control effectively functions, and thus, interest of the race game can be enhanced.

According to the present embodiment, it is possible to allow, for example, a player who is not good at a race game to cause a predetermined object to travel along the course, while suppressing giving the player an uncomfortable feeling, and thus, it is possible to enhance interest of the game. In particular, while preventing giving such a player an uncomfortable feeling while the player is successfully causing the predetermined object to travel along the course, if a state has established where off-course is likely to occur, for example, stronger correction is performed to prevent occurrence of the off-course, whereby such a state of successful traveling along the course can be made to continue.

BRIEF DESCRIPTION OF THE DRAWINGS

FIG. 9 is a non-limiting example of a program and information stored in a main memory 12 of a game apparatus body 3;

FIG. 34 is a non-limiting example flow chart showing details of the course orientation alignment process.

DETAILED DESCRIPTION OF NON-LIMITING EXAMPLE EMBODIMENTS

In the following, the present embodiment is described.

Figure 1:
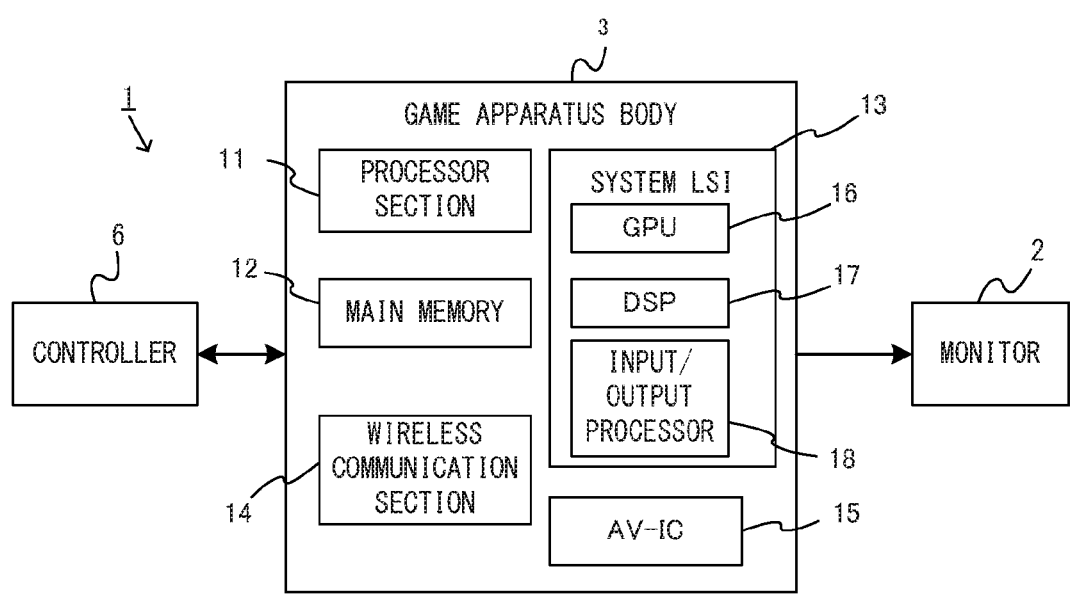
FIG. 1 is a functional block diagram of a non-limiting example game system according to the present embodiment.

FIG. 1 is a functional block diagram of a game system according to the present embodiment. In FIG. 1, a game system 1 includes: a household television receiver (hereinafter, referred to as "monitor") 2 which is one example of display means; a stationary game apparatus body 3 connected to the monitor 2 through a connection cord not shown; and a controller 6 wirelessly connectable to the game apparatus body 3.

The monitor 2 displays a game image outputted from the game apparatus body 3.

The game apparatus body 3 performs game processing and the like on the basis of a game program and the like stored in a predetermined storage medium (for example, memory card, optical disk, hard disk, or the like) that is readable by the game apparatus body 3. In the present embodiment, the game apparatus body 3 includes a processor section 11, a main memory 12, a system LSI 13, a wireless communication section 14, an AV-IC (audio video-integrated circuit) 15, and the like.

The processor section 11 executes a predetermined information processing program by use of the main memory 12, the system LSI 13, and the like. Accordingly, various functions (game processing, for example) in the game apparatus body 3 are realized.

The system LSI 13 includes a GPU (graphics processor unit) 16, a DSP (digital signal processor) 17, an input/output processor 18, and the like.

The GPU 16 generates an image in accordance with a graphics command (image creation command) from the processor section 11. The DSP 17 functions as an audio processor, and generates audio data by use of sound data and sound waveform (tone) data stored in the main memory 12. The input/output processor 18 performs, for example, transmission/reception of data to/from the controller 6 through the wireless communication section 14. Specifically; the input/output processor 18 receives, through the wireless communication section 14, operation data and the like transmitted from the controller 6, and (temporarily) stores the received operation data and the like in a buffer region of the main memory 12.

Of the image and audio generated by the game apparatus body 3, image data and audio data to be outputted to the monitor 2 are read out by the AV-IC 15. Through an AV connector not shown, the AV-IC 15 outputs the read image data to the monitor 2, and outputs the read audio data to a speaker built in the monitor 2.

Figure 2:
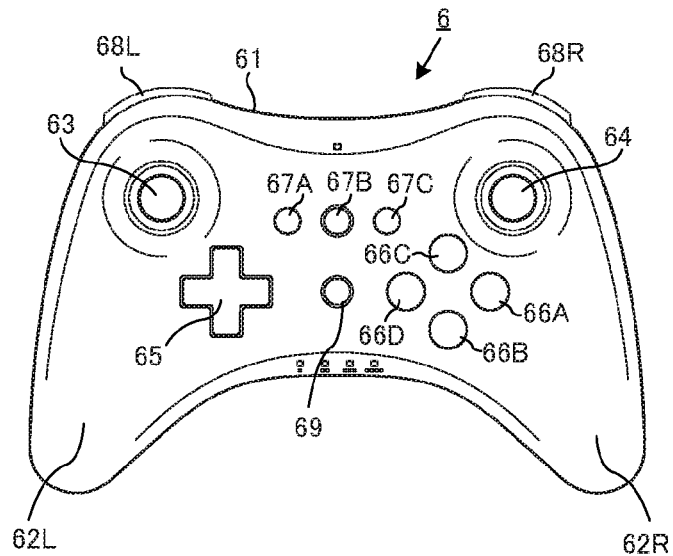
FIG. 2 is a front view of an external view of a controller 6.

The controller 6 transmits, to the game apparatus body 3, operation data indicative of the content of an operation performed on the controller 6. Here, with reference to FIG. 2 to FIG. 3, the controller 6 used in the present embodiment is described. FIG. 2 is a front view showing an external view of the controller 6. The controller 6 includes: a housing 61 including grips 62L, 62R at the left and the right (hereinafter, these may be collectively referred to as "grip 62"); a first analog stick 63 and a second analog stick 64 which respectively protrude from openings provided on the surface of the housing 61; and a digital button section including a plurality of operation buttons. The digital button section includes a cross key 65, first type operation buttons 66A to 66D, second type operation buttons 67A to 67C, an L button 68L, an R button 68R, and a power button 69. The first type operation buttons 66A to 66D are assigned, as appropriate, with functions corresponding to a game program performed by the game apparatus body 3 to which the controller 6 is connected (it should be noted that the L button 68L and the R button 68R are also assigned, as appropriate, with functions corresponding to the game program). For example, the operation buttons 66A to 66D are used in an accelerator operation, a brake operation, and the like for the own vehicle object in a race game described later. The second type operation buttons 67A to 67C are assigned with functions directly controlled by the system of the game apparatus, for example. For example, the second type operation buttons 67A to 67C are used as a home button, a start button, and a selection button.

The first analog stick 63 and the second analog stick 64 are each a joystick which is operable by being tilted in any desired direction (in any direction in 360 degrees) within a plane, with a neutral state which is a non-operation state set as a center. The first analog stick 63 and the second analog stick 64 are each used for instructing (inputting) the desired direction. In the present embodiment, the first analog stick 63 is used in steering operation in the race game described later.

Figure 3:
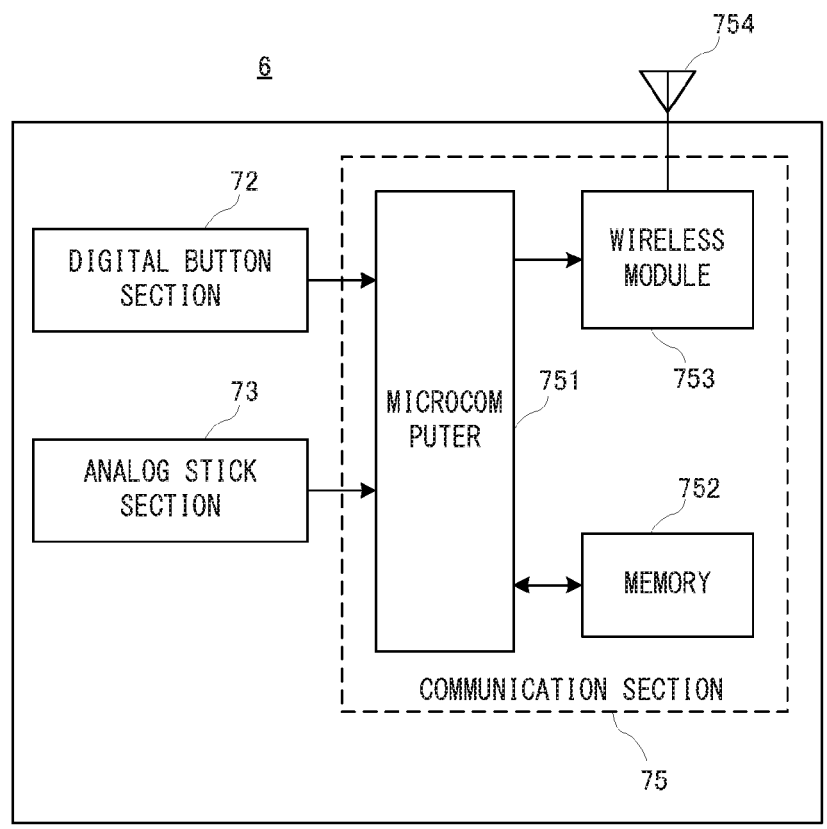
FIG. 3 is a functional block diagram showing a configuration of the controller 6.

Next, with reference to FIG. 3, an internal configuration of the controller 6 is described. FIG. 3 is a functional block diagram showing a configuration of the controller 6. In FIG. 3, the controller 6 includes a communication section 75, a digital button section 72, and an analog stick section 73. These component sections are electrically connected to one another.

The digital button section 72 outputs, to a microcomputer 751 of the communication section 75, signals indicative of an input state regarding the first type operation buttons 66A to 66D, the second type operation buttons 67A to 67C, the L button 68L, the R button 68R, and the power button 69 described above (i.e., whether or not each operation button has been pressed).

The analog stick section 73 outputs, to the microcomputer 751 of the communication section 75, signals indicative of input states regarding the first analog stick 63 and the second analog stick 64 described above. The analog stick section 73 is capable of detecting an input signal to each analog stick in multiple stages, for example, a direction input for a certain direction in 256 stages. For example, when a neutral position (neutral state being a non-operation state) is defined as 0, and a state where the analog stick is slid to its maximum in a certain direction is defined as 255, a signal indicative of how much the tilt is (hereinafter, referred to as tilting degree) can be outputted to the microcomputer 751.

The communication section 75 includes the microcomputer 751, a memory 752, a wireless module 753, and an antenna 754. The microcomputer 751 generates operation data on the basis of the above-mentioned signals obtained from the digital button section 72 and the analog slick section 73, while using the memory 752 as a storage region when performing processing. Then, the microcomputer 751 controls the wireless module 753 to wirelessly transmit the operation data to the game apparatus body 3.

Figure 4:
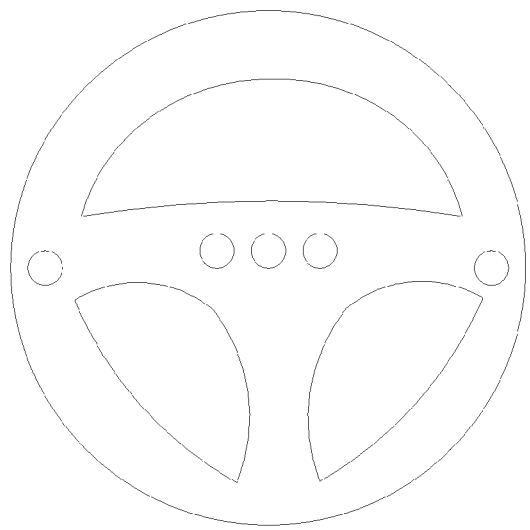
FIG. 4 shows a non-limiting example of a steering wheel controller.

In the description below, as one example of a controller with which to perform operation on an own vehicle object in a race game described later, the controller 6 as described above will be described. However, the controller to be used in operation on the own vehicle object is not limited thereto. In another embodiment, for example, a controller having built therein a motion detection sensor such as an acceleration sensor, an angular velocity sensor, or an inertial sensor may be used. In this case, for example, the tilt (attitude) of the controller itself is detected and the detected tilt may be used as the operation data (steering operation). For example, a controller having a shape similar to a steering wheel as shown in FIG. 4 may be used. The steering wheel controller has built therein a motion detection sensor mentioned above, and by use of the motion detection sensor, the tilt of the steering wheel controller is detected and the detected tilt may be used as the operation data.

Figure 5:
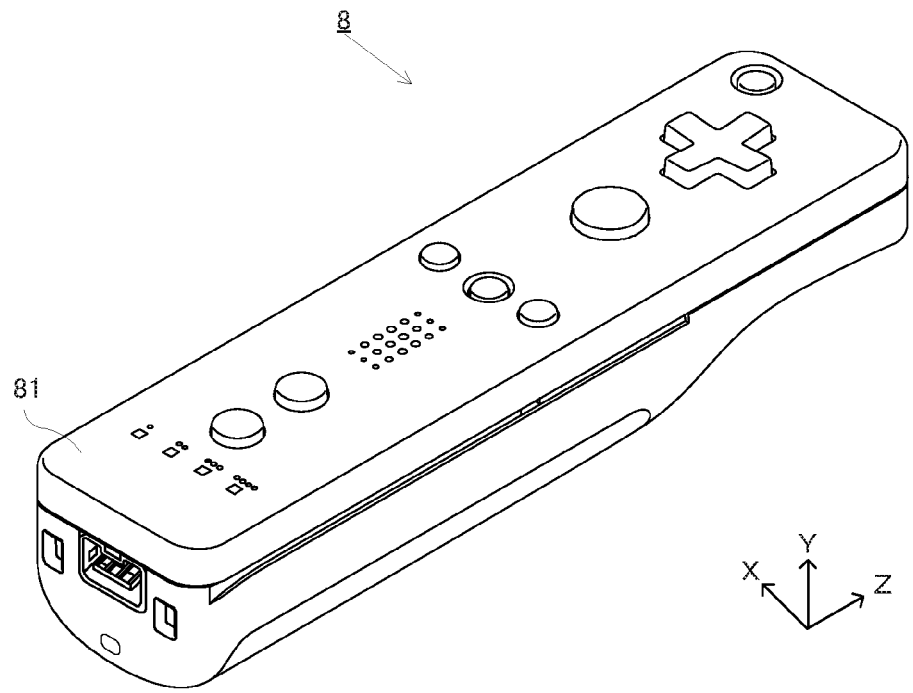
FIG. 5 shows a non-limiting example of another controller.

For example, a controller 8 having a shape as shown in FIG. 5 may be used. FIG. 5 is a perspective view of the controller 8 viewed from the front rear side thereof. The controller 8 in FIG. 5 includes: a housing 81; and an operation section composed of a plurality of operation buttons provided on the surface of the housing 81. The housing 81 has a generally parallelepiped shape extending in the longitudinal direction from front to rear. The whole housing 81 can be held with one hand by an adult or even a child. The housing 81 is formed by a plastic molding, for example. The controller 8 also has built therein a motion detection sensor as described above. A player may perform an operation similar to that performed with a steering wheel, by holding with both hands the controller 8 so as to extend sideways.

Figure 6:
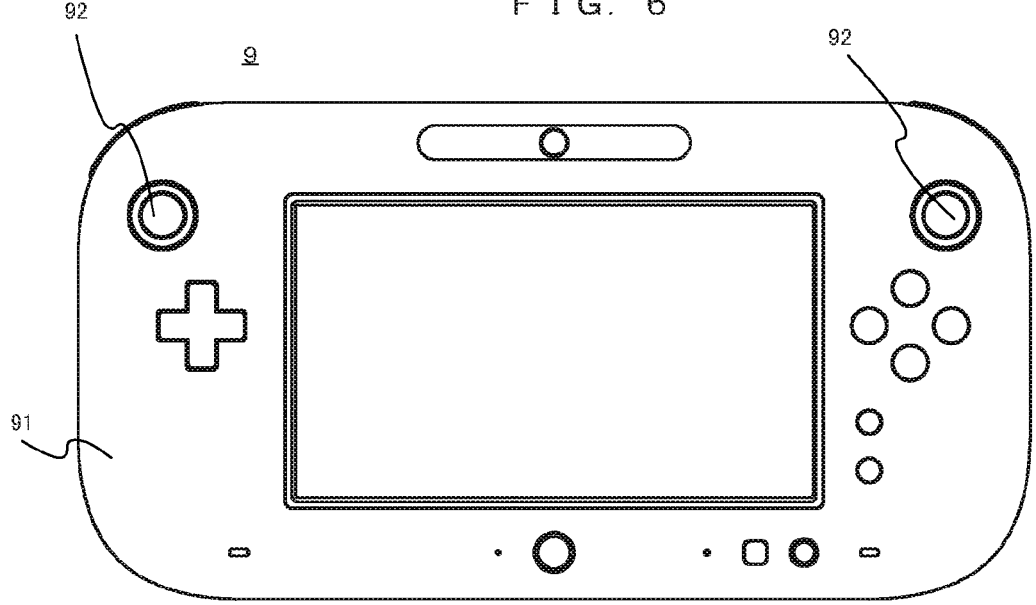
FIG. 6 shows a non-limiting example of another controller.

Other than this, a controller 9 with a display device as shown in FIG. 6 may be used. The controller 9 has a housing 91 formed by plastic molding, for example. In addition, the controller 9 includes, as an operation section, two analog sticks 92, a cross key, a plurality of operation buttons, and the like. The controller 9 also includes a motion detection sensor. The player can perform a steering operation by pressing each button provided to the controller 9, or by moving the controller 9 to change the position and the attitude thereof.

Figure 7:
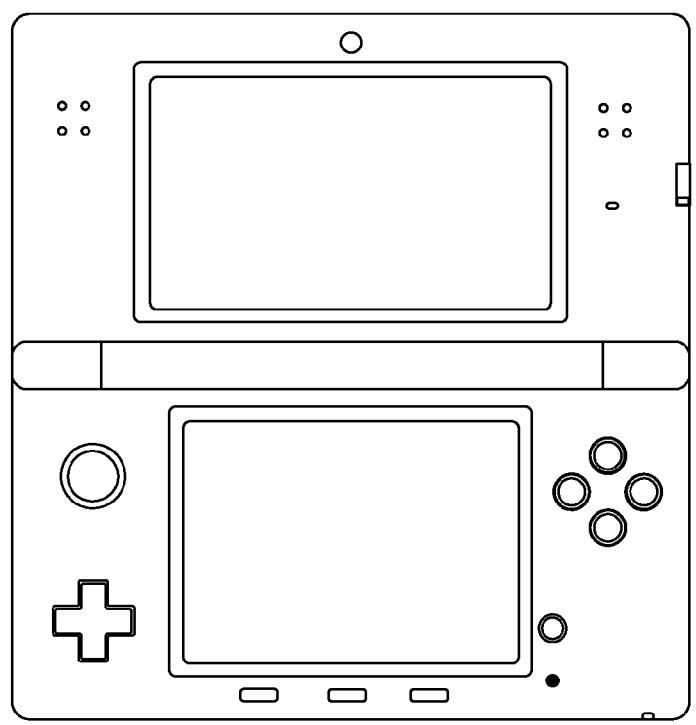
FIG. 7 shows a non-limiting example of a handheld game apparatus.

The processing described in the present embodiment can also be applied to a handheld game apparatus (an apparatus in which a controller and a game apparatus are integrated with each other) as shown in FIG. 7 other than the stationary game system as described above. Furthermore, such a handheld game apparatus may have built therein a motion detection sensor as described above.

Figure 8:
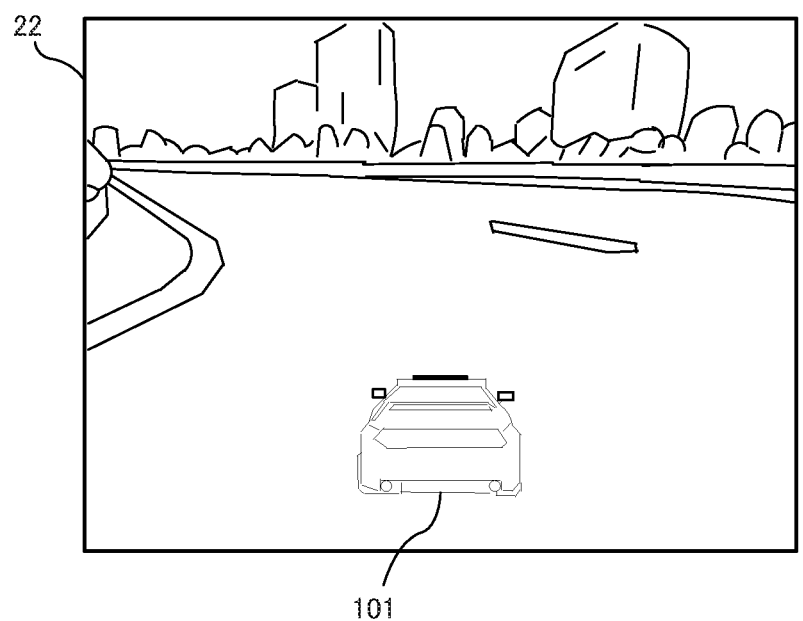
FIG. 8 is a non-limiting example of a game screen according to the present embodiment.

Next, the outline of operation of information processing (information processing performed in each handheld game apparatus) performed in an information processing system according to the present embodiment is described. In the present embodiment, a race game is described as an example. FIG. 8 is one example of a game screen according to the present embodiment. In this race game, a game image obtained by taking an image of a virtual three-dimensional space by means of a virtual camera is displayed. In FIG. 8, an own vehicle object 101 is displayed. The player performs an operation on the own vehicle object 101, by use of the controller 6 described above. In this game, an image of a so-called TPS view is displayed, basically. However, the image may be switchable between the TPS view and an FPS view by a predetermined operation.

Operation on the own vehicle object 101 is described. In the present embodiment, a steering operation of the own vehicle object 101 can be performed by use of the first analog stick 63 of the controller 6. That is, a steering operation can be performed by tilting the first analog stick 63 in the left-right direction. In other words, an input for instructing the moving direction of the own vehicle object 101 can be performed. An accelerator operation can be made by use of the A button 66A, and a brake operation can be made by use of the B button 66B. In the present embodiment, items that can be obtained during the race are arranged on the course. By pressing the R button 68R, for example, the player can "use" an item that the player has obtained. Use of an item, or for some items, a mere possession thereof, generates a predetermined effect that is advantageous for the player.

According to the present embodiment, in the race game as describe above, a process that supports a beginner of the race game or a player who is poor at the race game is performed so that the player can comfortably play the race game. Specifically, data of a steering wheel input based on a steering operation performed by the player is subjected to a process described later, whereby the value of the steering wheel input is corrected and steering wheel control and movement control of the own vehicle object 101 are performed.

Here, supplementary description of the value of a steering wheel input is given. In the present embodiment, the first analog stick 63 can detect a direction input to a direction, in 256 stages. With respect to a value in the left-right direction that can be inputted by the player by use of the first analog stick 63 (the value indicative of the tilting degree), it is assumed that the detected content is converted into a value within a range of $-1$ (left) to $+1$ (right) (0 is the neutral position), and the resultant value is used. In other words, a steering wheel input value that can be inputted by the player by use of the first analog stick 63 is a value within the range of $-1$ to $+1$. Meanwhile, in the race game in the present embodiment, as a steering wheel input value for controlling the own vehicle object 101, a range of $-2$ to $+2$ is assigned. That is, the steering wheel input value in the range of $-1$ to $+1$ based on an input operation performed by the player is corrected by a process described later, and consequently; can become a value in the range of $-2$ to $+2$. For example, a steering wheel input value of $-1$ inputted by the player is corrected to, for example, $-2$ through the process described later, and this corrected steering wheel input value is to be used in movement control of the own vehicle object 101. Accordingly, the own vehicle object 101 can also be moved by an amount corresponding to not less than a steering wheel input value that can be inputted by the player.

To be more specific, with respect to the correction (support process) of a steering wheel input value as described above, the following processes are mainly performed in the present embodiment.

(1) Off-Course Prevention Process

When the own vehicle object 101 is likely to go off the course, a process is performed in which a steering wheel input value based on an operation performed by the player trying to avoid the off-course is corrected so as to have a greater value such that the off course is prevented.

(2) Predictive Steering Process

When the own vehicle object 101 is not likely to go off the course at present but it is predicted that, irrespective of the presence/absence of a steering wheel input, the own vehicle object 101 is likely to go off the course if the own vehicle object 101 continues advancing as is, a process of correcting a steering wheel input that directs the own vehicle object 101 toward the travelling direction of the course is performed in advance so as to prevent the off-course.

(3) Basic Assistance Process

When a steering wheel input by the player is an input that directs the own vehicle object 101 toward the travelling direction of the course (toward the goal) (in other words, an input that causes neither an intentional reverse travel nor an intentional off-course), a process is also performed that corrects a steering wheel input value so as to direct the own vehicle object 101 toward the travelling direction of the course in accordance with the distance from the left and right edges (walls) of the course.

(4) Course Orientation Alignment Process

In a state where the risk of the own vehicle object 101 going off the course is low with respect to the position and the predicted traveling line of the own vehicle object 101, a process is also performed that corrects a steering wheel input value so as to allow the own vehicle object 101 to travel along the course as much as possible. In other words, in this process, in a state where the off-course risk and the like is low, a steering wheel input value is corrected so as to cause the attitude (orientation) of the own vehicle object 101 to be close to an attitude (orientation) along the course.

Through the processes as described above, even a beginner of a race game or a player who is poor at a race game can cause the own vehicle object 101 to travel along the course without causing off-course or the like. Accordingly, interest of the race game can be enhanced. In addition, since movement control of the own vehicle object 101 is performed by correcting the steering wheel input value based on an operation performed by the player, it is possible to support the steering operation without giving the player a unnatural feeling with respect to the behavior of the own vehicle object 101. For example, compared with control of directly correcting the speed of an own vehicle object irrespective of a steering operation performed by the player, it is possible to perform natural correction that fits the content of the steering operation actually performed by the player. Thus, it is possible to realize the support of the steering operation as described above without giving the player an uncomfortable feeling.

Even in a case where the player plays with another player in a competition play, and the opponent player is good at a race game, the assistance process as described above allows a relatively competitive race to be realized, whereby interest of the game can be enhanced (supplementary information: as a player is poorer at the race game, the player is likely to receive more benefits of the assistance process as described above, accordingly; and if a player is good at the race game, the assistance process as described above is less likely to be performed. As a result, a competitive race can be expected).

Next, with reference to FIG. 9 to FIG. 34, game processing in the present embodiment is described in more details.

FIG. 9 shows one example of a program and information stored in the main memory 12 of the game apparatus body 3. In the main memory 12, a game processing program 301, operation data 302, race course data 305, path data 306, assistance use setting data 307, assistance-process course information 308, player steering wheel input value 309, and the like are stored.

The game processing program 301 is a program for performing the race game processing as described above.

The operation data 302 is data indicative of various operations performed on the controller 6. The operation data 302 includes digital button data 303, analog stick data 304, and the like. The digital button data 303 is data indicative of the content of operation performed on each of various digital buttons as described above, and is data indicative of a pressed state of each of the various buttons. In the present embodiment, the digital button data 303 is data indicative of ON or OFF. The analog stick data 304 is data indicative of the content (tilting direction and tilting degree) of operation performed on the analog sticks. With respect to each of the two analog sticks, the analog stick data 304 expresses, in 256 stages, a tilting degree in a given direction.

The race course data 305 is data for constructing a race course described above. The race course data 305 includes data and the like regarding the shape of the course and objects arranged on the course.

Figure 10:
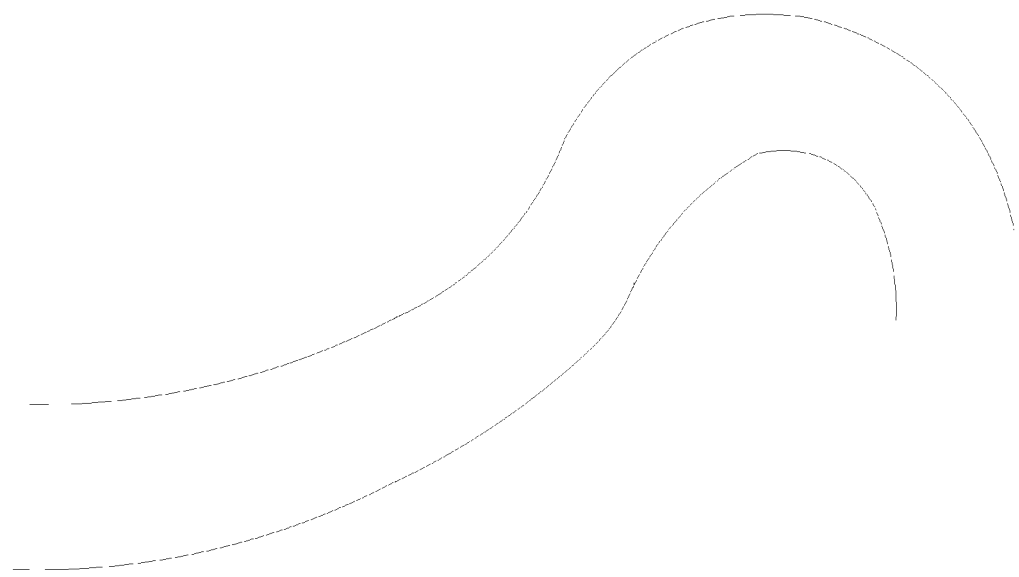
FIG. 10 is a non-limiting example diagram for describing the concept of paths.
Figure 11:
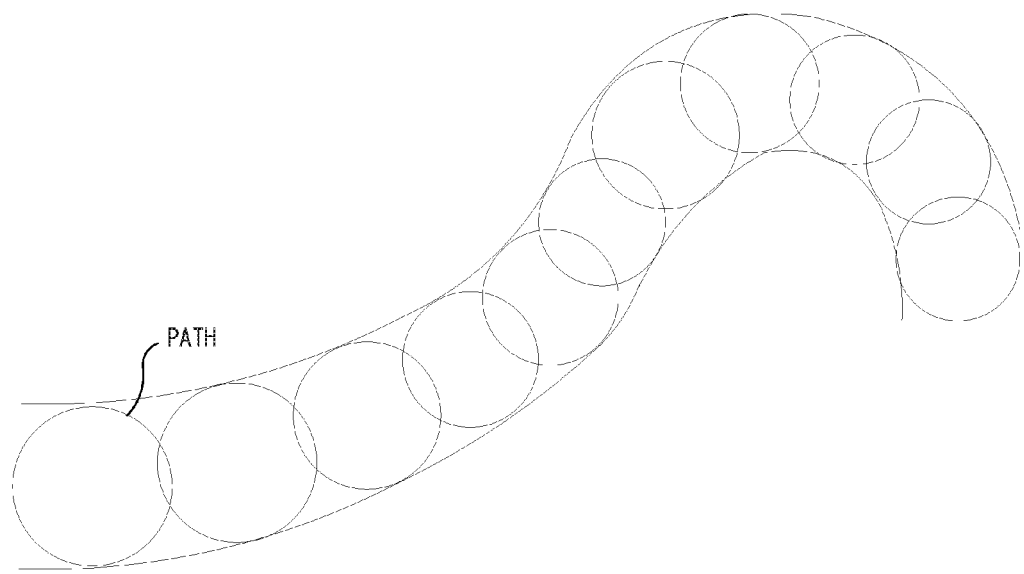
FIG. 11 is a non-limiting example diagram for describing the concept of paths.
Figure 12:
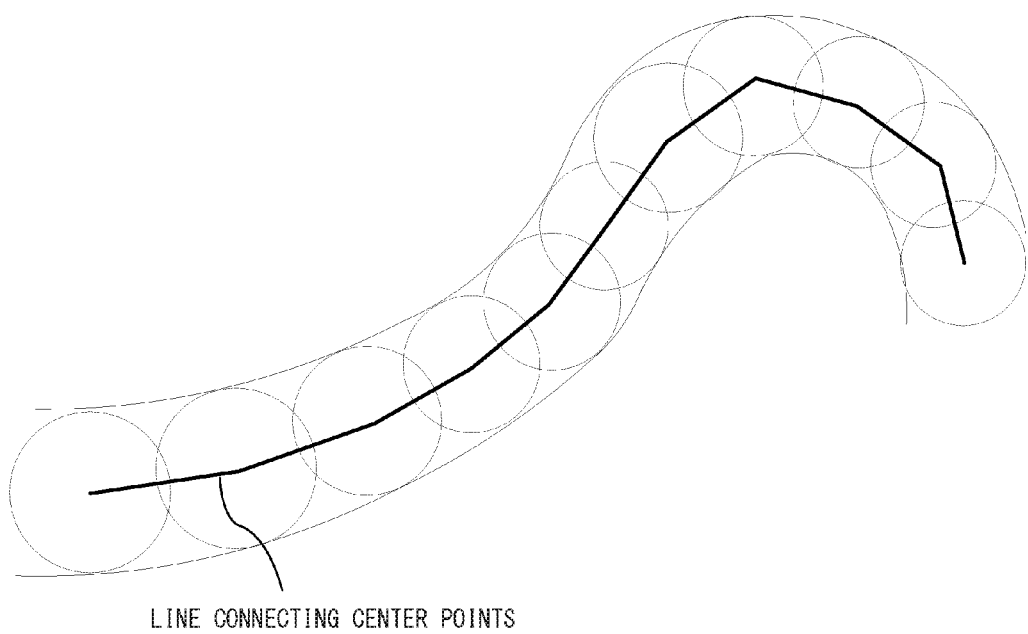
FIG. 12 is a non-limiting example diagram for describing the concept of paths.

The path data 306 is data generated in advance on the basis of the course of the race game, and is data serving as the basis for "paths" to be used in the processing described later. The concept of the paths is described with reference to FIG. 10 to FIG. 11. FIG. 10 is a bird's eye view of a part of the race course. FIG. 11 is a schematic diagram indicative of the concept of the paths generated on the basis of the race course. A plurality of paths are assumed to be arranged along the race course. In other words, each of the paths is assumed to correspond to a part of the race course. In FIG. 11, each path is indicated as a circle, but in the game processing, each path is assumed to have a sphere shape. Specifically, for each of the plurality of the paths, the path data 306 includes the center coordinate, the radius (size), information indicative of the normal, information indicative of the next path in the order of the paths, and information indicative of the immediately preceding path in the order. The path data 306 also includes information indicative of whether the path is a branched path or a normal path described later. With respect to the "order" of the paths, the path at the start point of the race course is the first path, and the path at the goal point is the last path. With respect to the center coordinate, if the axis indicative of the road width is defined as an x-axis, the height direction is defined as a y-axis, and the depth direction is defined as a z-axis, for example, the y-axis coordinate is set to be on the road surface (ground surface) of the course, in principle. The x-axis coordinate is set to be at the center of the road width. Therefore, if the center points (x-axis coordinates) of the respective paths are connected together along the course, a line that substantially extends along the center line of the race course is created (see FIG. 12). As seen from FIG. 11 and FIG. 12, each path can be considered as indicating the road width and the left and right edges (in other words, the border between the outer side and the inner side of the course) of the course at the position of the path (depending on the race course, for example, in a case of a tunnel-like or tube-like course, the height and the like of the course is also indicated). Thus, the path data 306 can also be considered as data indicative of the configuration of a predetermined part of the race course. In the present embodiment, by use of the path data 306, ascertainment of the path that the own vehicle object 101 has just passed and prediction of the travelling direction immediately after the path are performed. In a case where the course is branched, the path data 306 is also used in determination and the like of the branch destination. In the description below, the left and right edges in the width direction axis of the course described above will be collectively referred to as "course edge". In other words, in the description of the present embodiment, "course edge" means neither the start point nor the goal point, but means the left/right edge in the width direction of the course.

Figure 13:
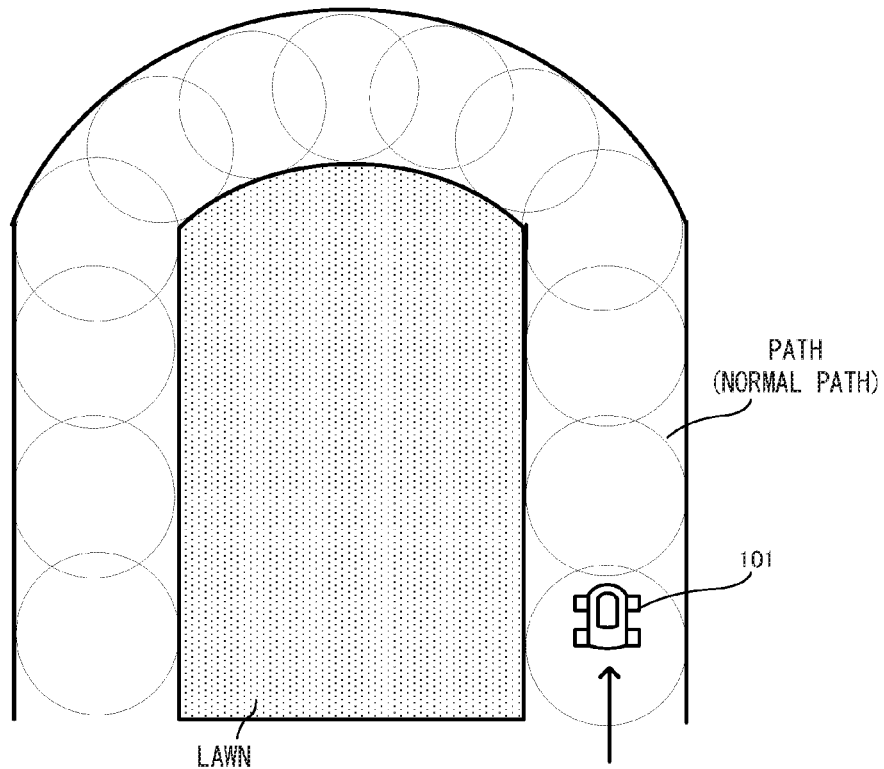
FIG. 13 is a non-limiting example diagram for describing a branch of a course.
Figure 14:
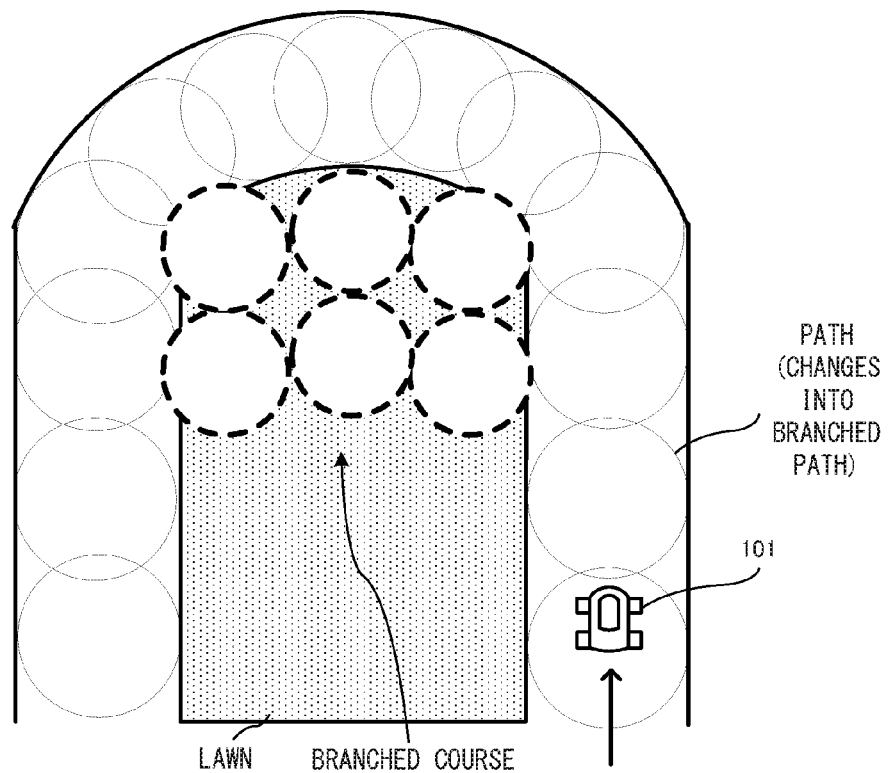
FIG. 14 is a non-limiting example diagram for describing a branch of the course.
Figure 15:
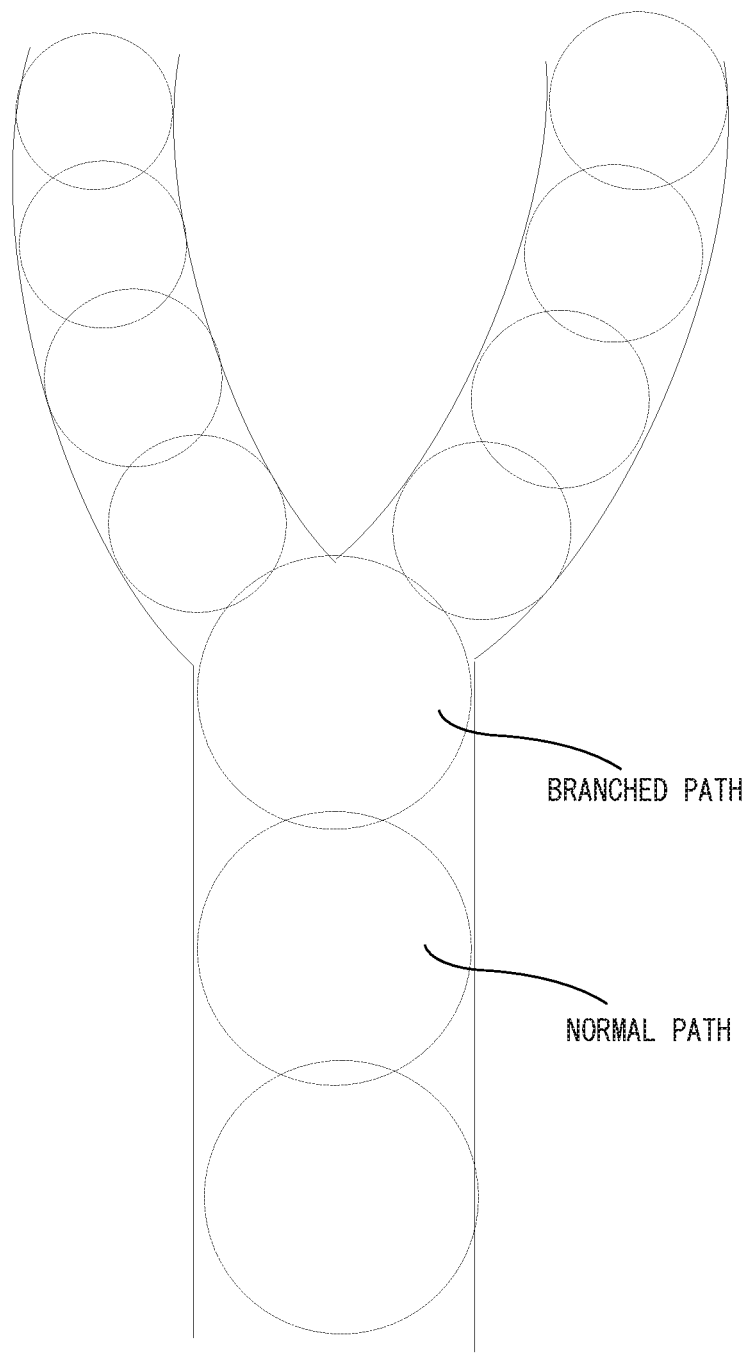
FIG. 15 is a non-limiting example diagram for describing a branch of the course.

Here, supplementary description of a branch of the course is given. In the race game in the present embodiment, when the own vehicle object 101 has satisfied a predetermined condition, a branched course emerges. For example, when the own vehicle object 101 has obtained a predetermined item disposed on the race course, a branched course emerges while the own vehicle object 101 possesses the item (until the own vehicle object 101 newly obtains another item), and the own vehicle object 101 becomes able to be moved to the branched course. For example, it is assumed that there are a course and path settings as shown in FIG. 13. FIG. 13 is a bird's eye view of a hairpin curve. In addition, it is assumed that "lawn" is present at a middle portion with respect to the course. Then, it is assumed that the own vehicle object 101 is travelling on the right side. It is assumed that FIG. 13 shows a state where the above-mentioned predetermined condition has not been satisfied. In this case, the own vehicle object 101 is only allowed to travel within the course, and is not allowed to enter the lawn portion. Meanwhile, when the predetermined condition has been satisfied, as shown in FIG. 14, six paths that correspond to a branched course emerge in the lawn portion. Then, the own vehicle object 101 becomes able to enter the portion where these paths are arranged. That is, while a predetermined condition is satisfied, a branched course emerges that allows the own vehicle object 101 to "go across the lawn". A lawn is shown in this example, but in a case where a course is branched into two according to the design thereof (see FIG. 15), it is needless to say that the travelling direction can be branched without requiring satisfaction of the predetermined condition. In the description below, a path having a plurality of paths either before or after the path may be referred to as "branched path", and a path not having a plurality of paths either before or after the path may be referred to as "normal path". In addition, the center point (center coordinate) of each path will be referred to as "center path point", the path point at the right edge will be referred to "right edge path point", and the path point at the left edge will be referred to as "left edge path point".

With reference back to FIG. 9, next, the assistance use setting data 307 is data indicative of whether or not the player uses the steering wheel assistance function as described in the present embodiment. For example, the assistance use setting data 307 is set on the basis of an input performed by the player, in "game setting" and the like of the race game.

The assistance-process course information 308 is data generated on the basis of the path data 306 described above, and is used in order to ascertain the left and right edges of the race course in determination and the like regarding off-course, for example.

The player steering wheel input value 309 is generated on the basis of the operation data 302, more specifically, on the basis of the analog stick data 304. The player steering wheel input value 309 is data indicative of the content of steering operation (steering wheel input amount) of the own vehicle object 101 based on an input onto the first analog stick 63 performed by the player. Specifically, the player steering wheel input value 309 is data obtained by converting, for each of the left and right directions of the first analog stick 63, the tilting degree of the first analog stick 63 expressed in 256 stages into a value within the range of −1 to +1, with 0 set at as a neutral position.

Figure 16:
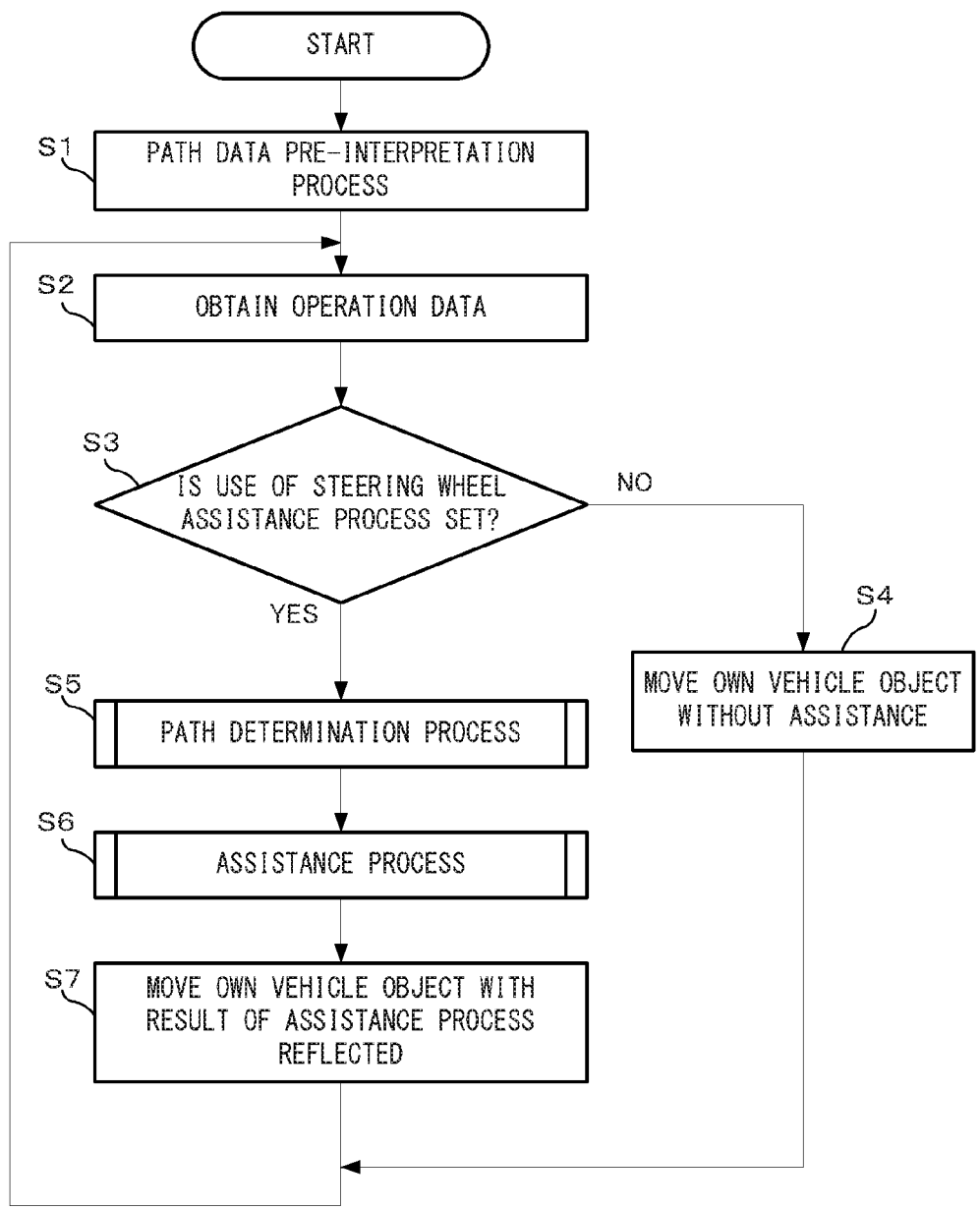
FIG. 16 is a non-limiting example flow chart showing details of a steering wheel assistance process.

Next, with reference to the flow chart shown in FIG. 16, the flow of a steering wheel assistance process in the race game performed by the processor section 11 of the game apparatus body 3 is described. Here, the process regarding the steering wheel assistance as described above is mainly described, and description of the other game processing is omitted because the other game processing does not have direct relevance.

FIG. 16 is a flow chart showing details of the steering wheel assistance process according to the present embodiment. The process loop of steps S2 to S7 in FIG. 16 is repeatedly performed every frame, for example.

Figure 17:
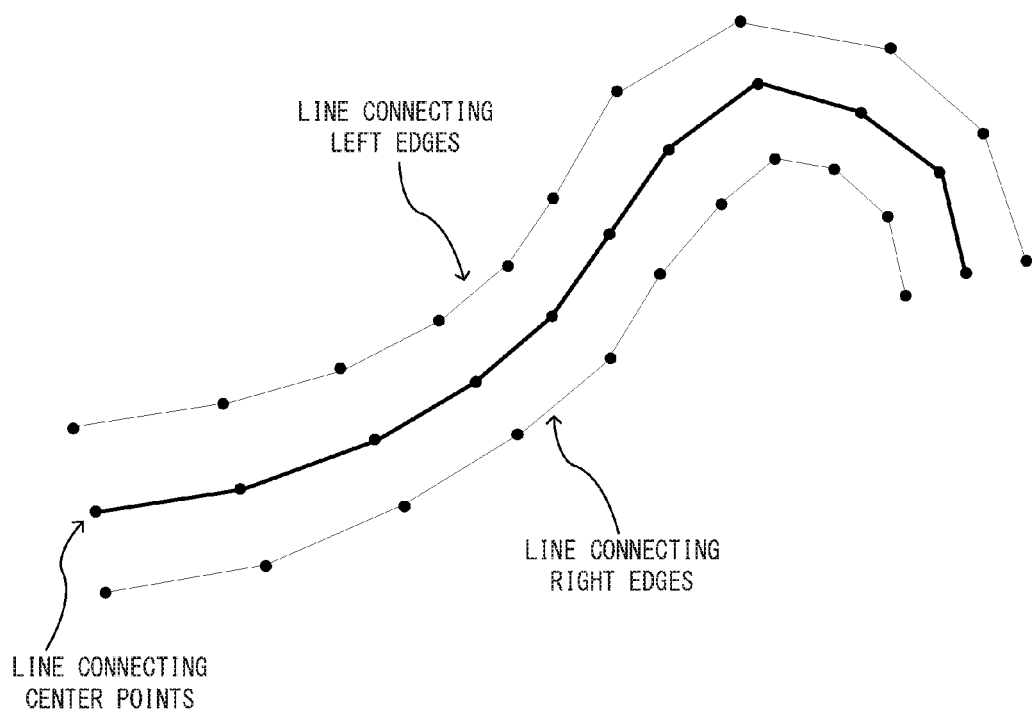
FIG. 17 is a non-limiting example of assistance-process course information 308

First, in step S1, the processor section 11 performs a path data pre-interpretation process. In this process, on the basis of the path data 306, a process of generating a plurality of paths as shown in FIG. 11 above is performed. Further, on the basis of the generated paths, a process of generating the assistance-process course information 308 is performed. FIG. 17 shows the concept of the assistance-process course information 308. FIG. 17 is an example of the assistance-process course information 308 based on the paths as shown in FIG. 11 above. The assistance-process course information is information that can be expressed by a line connecting the center points of the respective paths, a line connecting the right edge path points, and a line connecting the left edge path points.

With reference back to FIG. 16, next, in step S2, the processor section 11 obtains the operation data 302. Further, on the basis of the operation data 302, the processor section 11 generates the player steering wheel input value 309 indicative of a steering wheel input value according to an input performed by the player (i.e., the tilting degree in each of the left and right directions of the first analog stick 63 is converted into a value within the range of −1 to +1).

Next, in step S3, the processor section 11 refers to the assistance use setting data 307 and determines whether use of "steering wheel assistance" has been set. As a result of the determination, if the use of "steering wheel assistance" has not been set (NO in step S3), the processor section 11 performs, in step S4, a process of moving the own vehicle object 101 not using the assistance. That is, the processor section 11 performs control of the attitude and movement of the own vehicle object 101 using the player steering wheel input value 309 as is. Then, the process is returned to step S2, to be repeated.

Meanwhile, when use of "steering wheel assistance" has been set (YES in step S3), the processor section 11 performs a path determination process in step S5.

[Path Determination Process]

Figure 18:
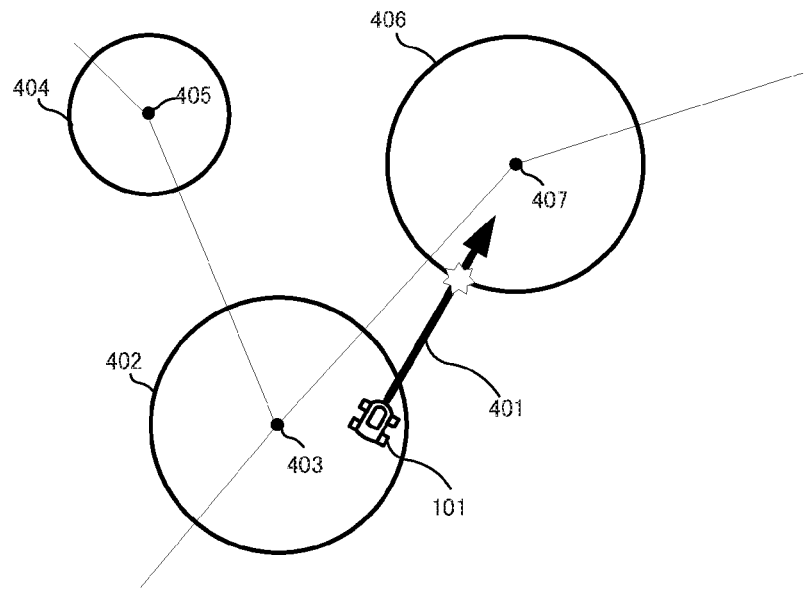
FIG. 18 is a non-limiting example diagram for describing the outline of a process performed in a path determination process.
Figure 19:
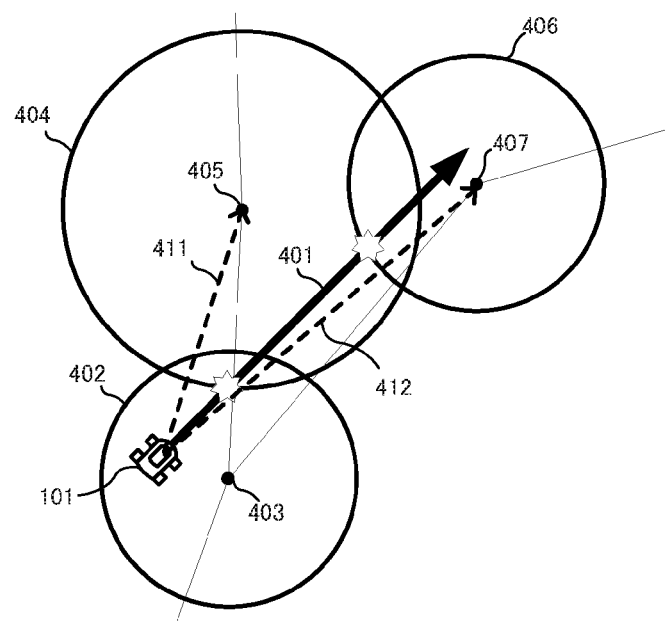
FIG. 19 is a non-limiting example diagram for describing the outline of a process performed in the path determination process.
Figure 20:
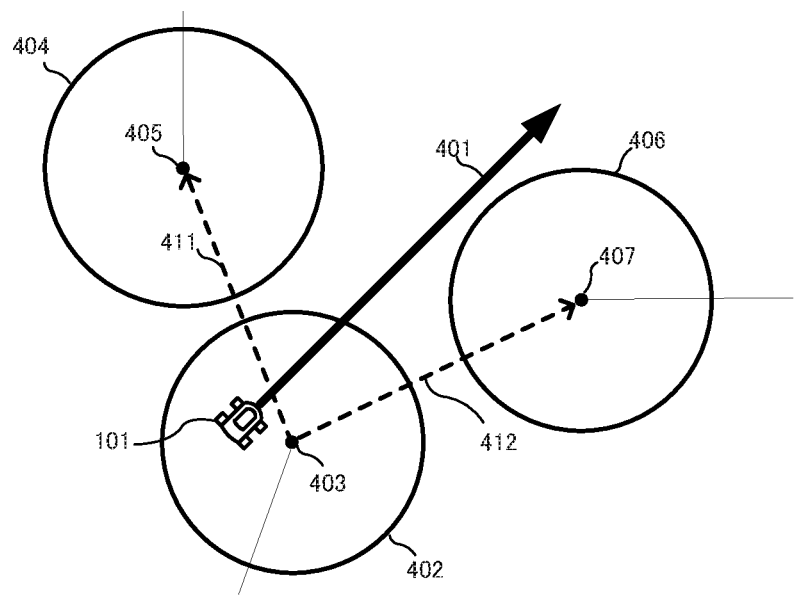
FIG. 20 is a non-limiting example diagram for describing the outline of a process performed in the path determination process.

Here, the outline of processes performed in the path determination process is described with reference to FIG. 18 to FIG. 20. In this process, a process of determining two paths for each of before and after the current position of the own vehicle object 101 is performed. In a case where there is a branch, a process of determining a branch destination is also performed. Specifically, first, on the basis of the position and orientation of the own vehicle object 101, a path point that is nearest to the own vehicle object 101 is searched for. In the following, this path point is referred to as "reference path point". In the search for the reference path point, control of preferentially selecting path points before and after the path point selected last time is also performed. Further, a process is also performed in which path points set before and after the reference path point are searched for, and whether the reference path point corresponds to a "normal path" or a "branched path" is determined (i.e., if a plurality of path points are present at either before or after the reference path point, the reference path point is determined as corresponding to a "branched path"). Since the presence/absence of a branch destination with reference the current position is determined in real time, even a case where a "hidden route" has suddenly emerged due to satisfaction of a predetermined condition, for example, can be flexibly managed.

When the reference path point has been determined, next, on the basis of the moving speed and the steering wheel input value of the own vehicle object 101, "reference direction" is calculated. This reference direction is expressed in the form of a direction vector indicative of the travelling direction of the own vehicle object at that time point. Further, by use of the reference direction, two path points for each of before and after the reference path point are determined. In the following, the two path points before and after the reference path point are referred to as a first front path point, a second front path point, a first rear path point, and a second rear path point. When the reference path point corresponds to a branched path as described above, the branch destination thereof is also determined. One example of how to determine a first front path point when the reference path is a branched path is described, using the positional relationship between the own vehicle object and paths as shown in FIG. 18. In FIG. 18, the own vehicle object 101, a reference direction (vector) 401, a path 402 that is nearest to the own vehicle object 101, and a reference path point 403 thereof are shown. In addition, the path 402, is a branched path, and as paths that are to serve as branch destinations (candidate paths), a first candidate path 404 and a first candidate path point 405 as the center point thereof, a second candidate path 406 and a second candidate path point 407 as the center point thereof are also shown. In the case of this positional relationship, first, it is determined whether a candidate path (assumed as having a sphere shape) that is to collide is present ahead of the reference direction 401. In the case of FIG. 18, only the second candidate path 406 is in the relationship of colliding with the reference direction 401. Thus, when there is only one candidate path that collides, the path point (the second candidate path point 407) of the colliding candidate path is determined as the first front path point (in other words, the next path point).

Next, an example in which there are a plurality of candidate paths that will collide with the reference direction 401 is described with reference to FIG. 19. FIG. 19 shows a positional relationship in which both the first candidate path 404 and the second candidate path 406 will collide with the reference direction 401. In this case, first, direction vectors 411 and 412 respectively directed from the own vehicle object 101 to candidate path points (in the example shown in FIG. 19, the first candidate path point 405 and the second candidate path point 407) are calculated. Then, of the calculated direction vectors, a direction vector that is nearest to the reference direction 401 is determined, and the candidate path point according to the direction vector is determined as the next path point (first front path point). In the example shown in FIG. 19, since the direction vector 412 is nearer to the reference direction 401 than the direction vector 411, the second candidate path point 407 is determined as the first front path point.

Next, an example of a case where there is no path that will collide with the reference direction 401 is described with reference to FIG. 20. FIG. 20 shows a positional relationship in which the reference direction 401 collides with neither the first candidate path 404 nor the second candidate path 406. In this case, of the direction vectors from the reference path point 403 toward the path points 405 and 407 of the respective candidate paths, the path point according to a vector that is nearest to the reference direction is determined as the first front path point. In the example shown in FIG. 20, since the direction vector 412 is nearer to the reference direction 401 than the direction vector 411, the second candidate path point 407 is determined as the first front path point.

The second front path point is also determined through a process similar to that described above. That is, using a path according to the first front path point as the reference path (the reference direction is used as is), a process similar to that described above is performed.

With respect to determination of the first rear path point, first, paths that the own vehicle object 101 have passed are stored (for example, eight paths at maximum are stored). Then, if there is a path that the own vehicle object 101 has passed when rear path candidates described above are searched for, the path point according to the path is determined as the first rear path point. Meanwhile, in a case where no path point that the own vehicle object 101 has passed s stored, a process similar to that described above is performed by use of a vector obtained by reversing the reference direction described above. Also for determination of the second rear path point, a similar process is performed.

When the reference path point and two path points for each of before and after the reference path point have been determined as described above, a path interpolation process is further performed. The interpolation process is a process of performing curve interpolation on the basis of the right edge path point and the left edge path point of each of the five paths determined as above. In other words, the interpolation process is a process of calculating the left and right edges (walls) of the course on the basis of the above five path points (a process of fixing the size of the left-right width of the course, so to speak). By connecting the right edge path points of the respective five paths determined above while performing curve interpolation, the right edge of the course before and after the own vehicle object 101 (a concept such as a wall indicative of the right edge in the course width, so to speak) is calculated. Similarly, by connecting the left edge path points while performing curve interpolation, the left edge of the course before and after the own vehicle object 101 (a concept such as a wall indicative of the left edge in the course width, so to speak) is calculated. Information of the edges of the course calculated in this manner is used as "course edge" in the off-course prevention process and the like described later. In addition, by performing such curve interpolation, even when the own vehicle object 101 is caused to travel by use of an assistance process described later, smooth travel can be realized.

Since the left and right edges of the course are generated on the basis of the paths described above, the left and right edges of the course need not strictly match the positions of the left and right edges of the race course actually displayed on the screen, and may be at slightly shifted positions.

Meanwhile, the path determination process as described above can also be considered as real time determination (ascertainment) of the configuration of the course (positions and the like of the course edge) in the surroundings of the own vehicle object 101. Thus, with respect to the course branching as described above, even in a case where a branched course emerges only when a predetermined condition has been satisfied, a flexible management can be realized. Accordingly, expanded gimmicks and the like of the race course can be realized, and interest of the game can be enhanced.

Figure 21:
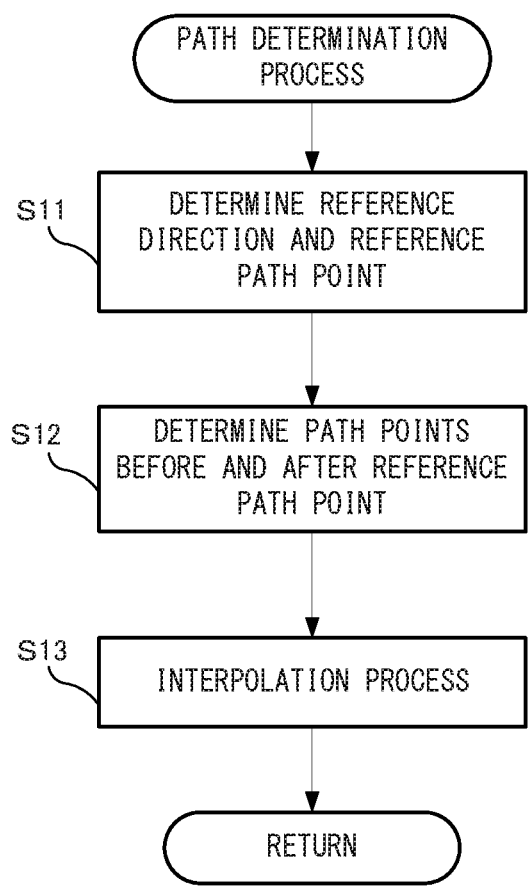
FIG. 21 is a non-limiting example flow chart showing details of the path determination process.

Next, FIG. 21 shows a flow chart showing details of the path determination process. With reference to FIG. 21, first, in step S11, the processor section 11 performs a process of calculating and determining the reference direction and the reference path point as described above. In addition, a process is performed that determines whether the determined reference path point corresponds to a normal path or a branched path.

Next, in step S12, the processor section 11 performs a process of determining four path points as described above, i.e., the first front path point, the second front path point, the first rear path point, and the second rear path point.

Next, in step S13, the processor section 11 performs the interpolation process as described above, on the basis of the determined five path points. Then, the path determination process ends.

Figure 22:
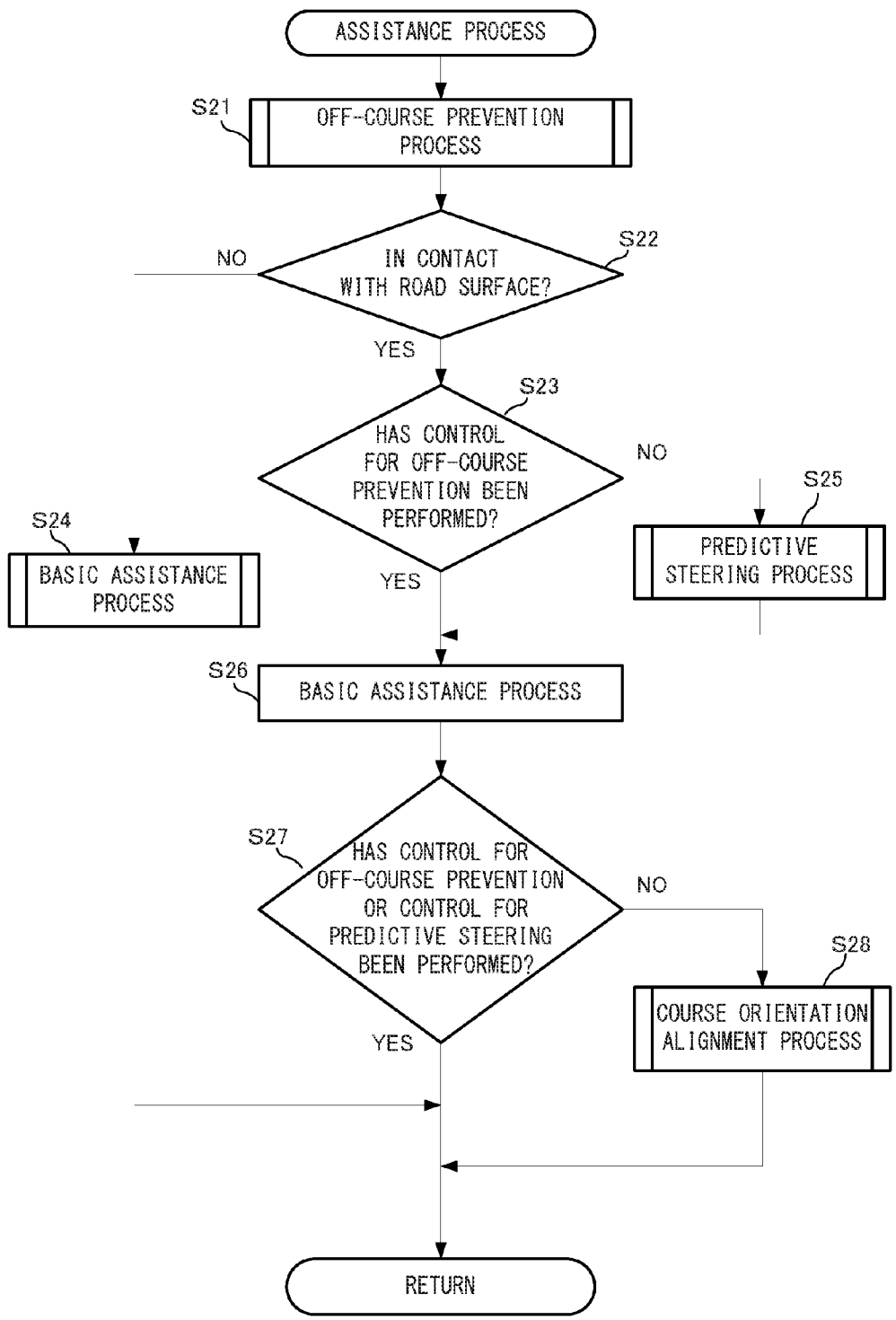
FIG. 22 is a non-limiting example flow chart showing details of an assistance process.

With reference back to FIG. 16, when the path determination process has ended, the processor section 11 performs the assistance process in step S6, next. FIG. 22 is a flow chart showing details of the assistance process. In FIG. 22, first, the processor section 11 performs the off-course prevention process in step S21.

[Off Course Prevention Process]

Figure 23:
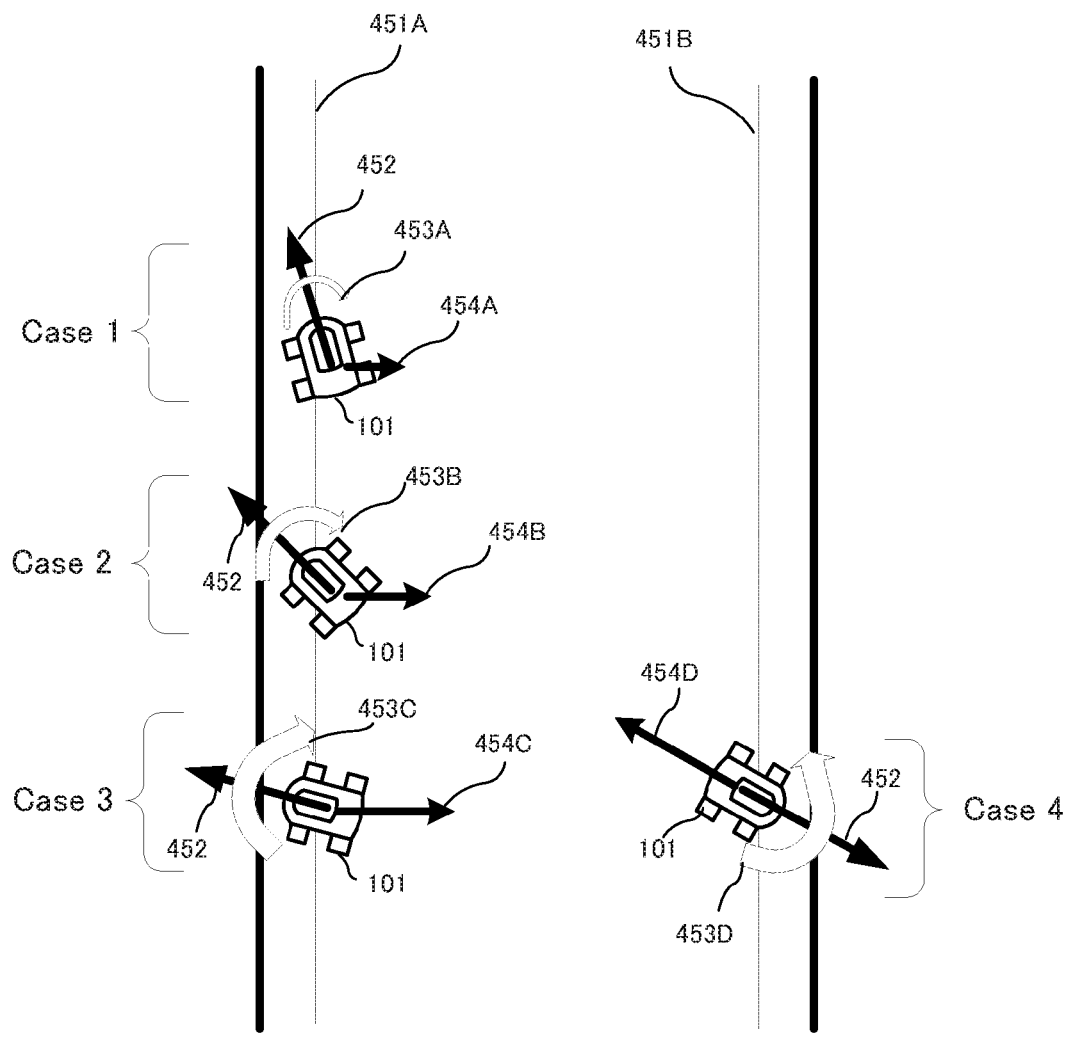
FIG. 23 is a non-limiting example diagram for describing the outline of an off-course prevention process.

The off-course prevention process is described with reference to FIG. 23. FIG. 23 is a schematic diagram showing some examples of the off-course prevention process. First, this process is performed in a state where the own vehicle object 101 is very close to the course edge, in other words, in a state where off-course is about to happen. With reference to the examples shown in FIG. 23, the execution condition thereof is the presence of a state in which (a part of) the own vehicle object 101 is present to the left side relative to a threshold line 451A, or to the right side relative to threshold line 451B. Then, on the basis of the a speed vector 452 (the speed and direction) of the own vehicle object 101 and the orientation (the direction in which the own vehicle object 101 should travel) of the course edge that is nearest from the own vehicle object 101, a direction in which to forcedly rotate the steering wheel (additionally to the control according to the steering wheel input value from the player) and the amount of the forced rotation (correctively indicated as a correction amount 453 in FIG. 23) are calculated. Here, the speed vector 452 includes components indicative of the moving speed of the own vehicle object 101 and the direction in which the own vehicle object 101 moves.

FIG. 23 shows four examples (Cases). In these examples, for all the Cases, the orientation of the course edge described above (travelling direction) is the up-direction in the drawing. In these examples, the own vehicle object 101 is approaching the course left edge at an angle closer to a right angle (meaning "perpendicular") in Case 2 than in Case 1. In addition, the own vehicle object 101 is approaching the course left edge at an angle further closer to an right angle in Case 3 than in Case 2. Thus, the steering wheel needs to be rotated by a greater amount in Case 2 than in Case 1. In addition, the steering wheel needs to be rotated by a greater amount in Case 3 than in Case 2. Therefore, although the direction in which to rotate the steering wheel is the right direction in all the cases, with respect to the amount of the rotation (correction amounts 453A to 453C), the correction amount 453B of Case 2 is calculated so as to be greater than the correction amount 453A of Case 1. Further, the correction amount 453C of Case 3 is calculated so as to be greater than the correction amount 453B of Case 2. In other words, control is performed such that: as the angle of the speed vector 452 relative to the course edge becomes closer to a right angle, the correction amount thereof is calculated so as to be greater, accordingly; and as the angle between the speed vector 452 and the travelling direction becomes smaller, the correction amount thereof also becomes smaller, accordingly.

Separately from the direction in which to rotate the steering wheel and the amount of the rotation described above, forced movement vectors 454A to 454C each indicative of a force that forcedly moves the own vehicle object 101 are also calculated on the basis of the speed vector 452 of the own vehicle object 101 and the orientation of the course edge (the direction in which the own vehicle object 101 should travel). Since occurrence of off-course may not be prevented by the above-described correction of the steering wheel input value alone, the forced movement vector is used, separately from the correction of the steering wheel input value, to cause the own vehicle object 101 to move away from the course edge (in such a manner as to cause the own vehicle object 101 to slide to the inner side of the course, with the attitude of the own vehicle object 101 maintained). More specifically, an acceleration based on the forced movement vector is applied to the own vehicle object 101. That is, movement based on the forced movement vector is added to the movement of the own vehicle object 101 based on the corrected steering wheel input value. Also with respect to the forced movement vector, the forced movement vector 454B of Case 2 is stronger (longer) than the forced movement vector 454A of Case 1, and the forced movement vector 454C of Case 3 is stronger than the forced movement vector 454B of Case 2. In these examples, since the speed vector is oriented to the travelling direction side, the direction of the forced movement vector is the right direction in all of Cases 1 to 3.

With respect to Case 4, a state is shown in which the own vehicle object 101 is approaching the course right edge with a slightly reversed orientation. Also in this case, on the basis of the speed vector 452 of the own vehicle object 101 and the orientation of the course edge (the direction in which the own vehicle object 101 should travel), the steering direction to be corrected and a correction amount 453D, and a forced movement vector 454D are calculated. In this case, since the speed vector of the own vehicle object 101 includes a component in a reverse direction to the travelling direction, a forced movement vector toward the left-up direction (a vector in a reverse direction to the speed vector 452) is calculated in order to make it easier to direct the own vehicle object 101 to the travelling direction side.

Thus, in the off-course prevention process, in a case where occurrence of off-course cannot be avoided if the current state continues, a correction amount of the steering wheel input value and a forced movement vector for preventing occurrence of off-course are calculated on the basis of the speed vector of the own vehicle object 101 and the orientation of the course edge that is nearest from the own vehicle object 101.

According to the present embodiment, in the off-course prevention process, a correction direction/correction amount of the steering wheel input value and a forced movement vector are calculated in order to ensure prevention of off-course of the own vehicle object 101. In other words, even if the player intentionally tries to make the own vehicle object 101 go off the course, the off-course is prevented as long as the off-course prevention process is functioning.

Figure 24:
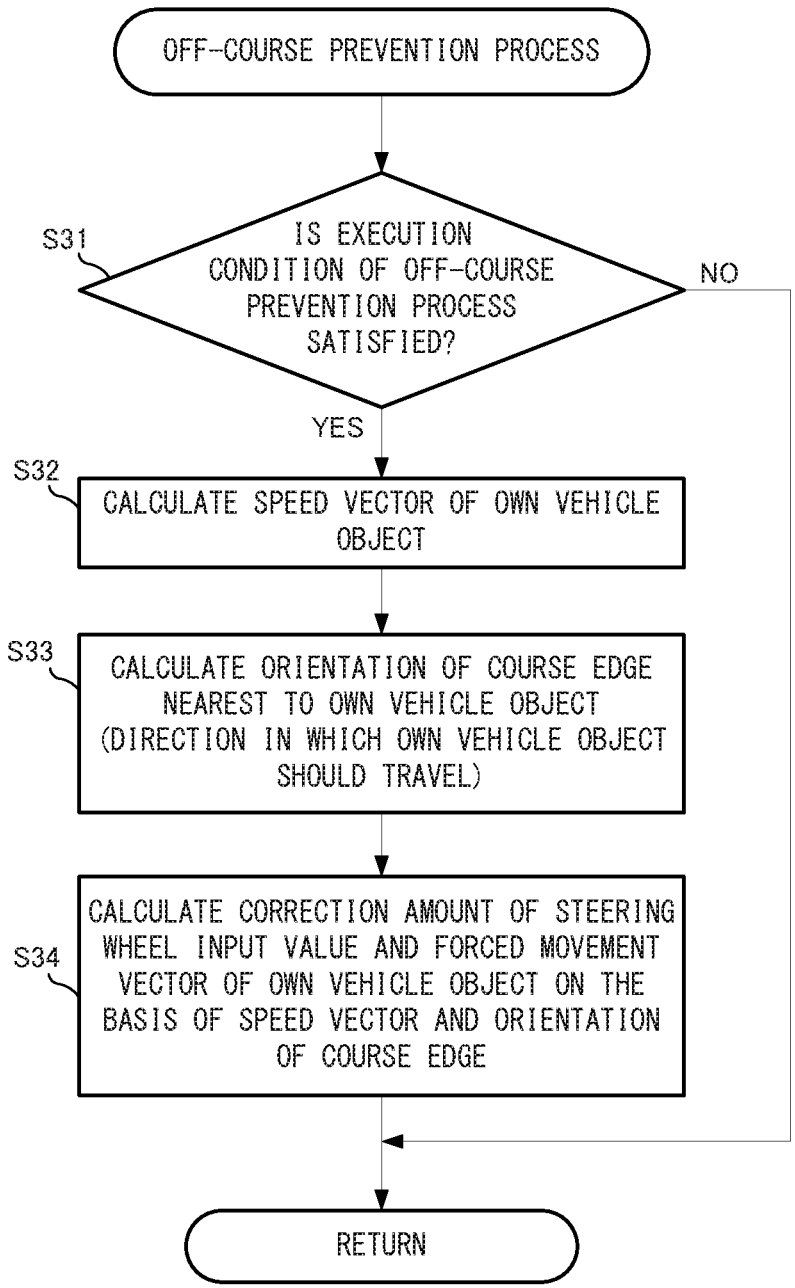
FIG. 24 is a non-limiting example flow chart showing details of the off-course prevention process.

FIG. 24 shows a flow chart of the off-course prevention process. With reference to FIG. 24, first, in step S31, the processor section 11 determines whether the condition for performing the off-course prevention process as described above has been satisfied. In the examples above, whether the own vehicle object 101 is present to the outer side (the side nearer to the course edge) of the threshold line 451A or 451B is determined, and if the own vehicle object 101 is present to the outer side, it is determined that the execution condition has been satisfied. It should be noted that this determination process is not limited to the determination process that uses the threshold line 451 as described above, and may use any determination process as long as similar determination can be performed.

As a result of the determination in step S31, if the execution condition has not been satisfied (NO in step S31), the off-course prevention process ends. That is, the off-course prevention process is not performed in this case. Meanwhile, if it is determined that the execution condition has been satisfied (YES in step S31), the processor section 11 calculates the speed vector 452 of the own vehicle object 101 in step S32. Further, in step S33, the processor section 11 calculates the orientation of the course edge that is nearest from the own vehicle object 101. Then, in step S34, the processor section 11 calculates the steering wheel input correction amount 453 and the forced movement vector 454 on the basis of the speed vector 452 and the orientation of the course edge. Then, the off-course prevention process ends.

With reference back to FIG. 22, in step S22 following the off-course prevention process, the processor section 11 determines whether the own vehicle object 101 is in contact with a road surface portion of the race course. In other words, it is determined whether the own vehicle object 101 is not in the air (due to jumping or the like). As a result of the determination, if the own vehicle object 101 is not in contact with the road surface (NO in step S22), the basic assistance process described later is performed in step S24. Meanwhile, if the own vehicle object 101 is in contact with the road surface (YES in step S22), the processor section 11 determines, in step S23, whether the control for off-course prevention described above has been performed. That is, it is determined whether the determination result in step S31 in FIG. 24 is YES. As a result, if the control for off-course prevention has been performed (YES in step S23), the processor section 11 performs the basic assistance process in step S26. Meanwhile, if the control for off-course prevention has not been performed (NO in step S23), the processor section 11 performs the predictive steering process in step S25, and then, performs the basic assistance process in step S26.

[Predictive Steering Process]

Figure 25:
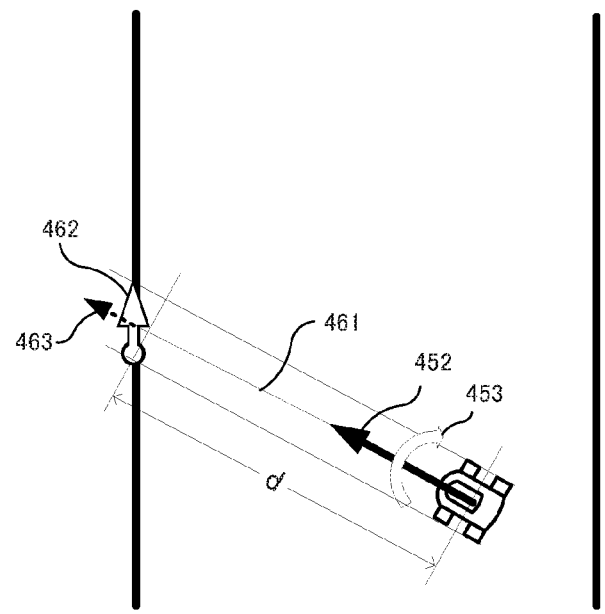
FIG. 25 is a non-limiting example diagram for describing the outline of a process performed in a predictive steering process.
Figure 26:
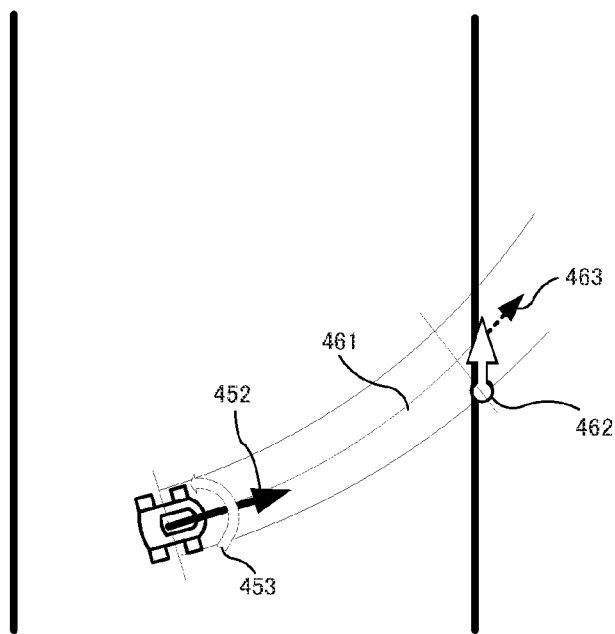
FIG. 26 is a non-limiting example diagram for describing the outline of a process performed in the predictive steering process.

The predictive steering process and the basic assistance process are described. First, the predictive steering process is described. FIGS. 25 to 26 are diagrams for describing the outline of processes performed in the predictive steering process. In this process, in a case where occurrence of off-course, although not immediately, is predicted if the own vehicle object 101 continues advancing as is, the steering wheel input is corrected so as to realize a state where the own vehicle object 101 can travel along the direction in which the own vehicle object 101 should travel in the course, in order to reduce the risk of off-course. FIG. 25 shows one example of correction obtained through predictive steering at the time when the own vehicle object 101 is traveling straight (including a case where the player is not performing steering operation). FIG. 26 shows an example of predictive steering at the time when the own vehicle object 101 is not traveling straight, i.e., in a state where there is a steering wheel input in either the left direction or the right direction, or in a state where the own vehicle object 101 is "drifting".

First, a condition of performing the predictive steering process is described. This process is performed when control for off-course prevention has not been performed and when a direct distance d between the own vehicle object 101 and the course edge is shorter than a predetermined value. That is, this process can be performed in a state where the own vehicle object 101 is near the course edge to some extent.

As a process of predictive steering in a case where the own vehicle object 101 is traveling straight, the following process is performed. First, on the basis of the speed vector 452 of the own vehicle object 101, a traveling line 461 of the own vehicle object 101 is predicted. Next, on the basis of the predicted traveling line 461, the point of collision between the own vehicle object 101 and the course edge is predicted (hereinafter, this point is referred to as "predicted collision point"). Then, the orientation (travelling direction) of the course edge at this predicted collision point is calculated. In FIG. 25, the predicted collision point and the orientation thereof are indicated as a course edge orientation 462 composed of a dot and an arrow.

Here, in the present embodiment, the predicted collision point is calculated on the basis of the left/right edge in the width of the own vehicle object 101 used as a reference. In the example shown in FIG. 25, the own vehicle object 101 is predicted to collide with the left course edge, and thus, a straight line connecting the left edge of the own vehicle object 101 and the course edge is used in calculation of the course edge orientation 462 (in a case where collision to the right course edge is predicted, a straight line connecting the right edge of the own vehicle object 101 and the course edge is used in the calculation). In another embodiment, not limited thereto, a straight line passing the center of the own vehicle object 101 may be used to calculate the predicted collision point, for example.

When the course edge orientation 462 has been calculated as described above, the direction in which to forcedly rotate the steering wheel and the amount of the rotation, i.e., the steering wheel input correction amount 453, are calculated on the basis of the course edge orientation 462 and the speed vector 452 (speed component and orientation component). In FIG. 25, rightward rotation of the steering wheel and the correction amount thereof are calculated. Thus, even if the player is not performing steering operation in a state as shown in FIG. 25, a certain level of steering wheel input is generated rightward, and the orientation (attitude) of the own vehicle object is changed so as to slightly match the travelling direction of the course.

Figure 27:
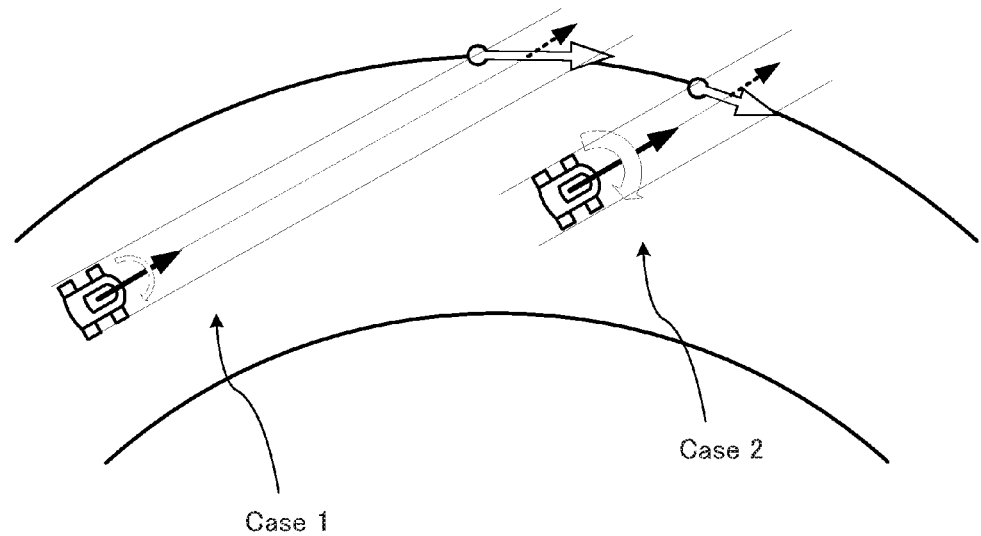
FIG. 27 is a non-limiting example diagram for describing a correction amount of a steering wheel input value.

Here, supplementary description of the correction amount (the direction in which to rotate the steering wheel and the amount of the rotation) of the steering wheel input value is given with reference to FIG. 27. As shown in Case 1 in FIG. 27, as a distance d from the own vehicle object 101 to the course edge is larger and the orientation of the course and the orientation of the own vehicle object 101 at the predicted collision point are closer to each other, the correction amount is calculated so as to become smaller, accordingly. As shown in Case 2, as the distance d from the own vehicle object 101 to the course edge is smaller and the orientation of the course and the orientation of the own vehicle object 101 at the predicted collision point are more deviated from each other, the correction amount is calculated so as to become larger, accordingly.

Next, the predictive steering process performed when the own vehicle object 101 is not traveling straight as shown in FIG. 26 is described. In the above-described case where the own vehicle object 101 is traveling straight, the traveling line 461 also becomes a straight line, and thus, the correction amount 453 of the steering wheel input value is calculated by use of the orientation component indicated by the speed vector 452. Meanwhile, in a state where there is a steering wheel input in either the leftward direction or the rightward direction, or in a state where the own vehicle object 101 is drifting, the predicted traveling line is no longer a straight line. Thus, when the own vehicle object 101 is not traveling straight, the orientation of the own vehicle object 101 predicted at the predicted collision point is used, instead of the orientation component of the speed vector 452. With reference to FIG. 26, the correction amount 453 of the steering wheel input value is calculated by use of the orientation indicated by an orientation-at-collision 463, not the orientation of the speed vector 452.

Figure 28:
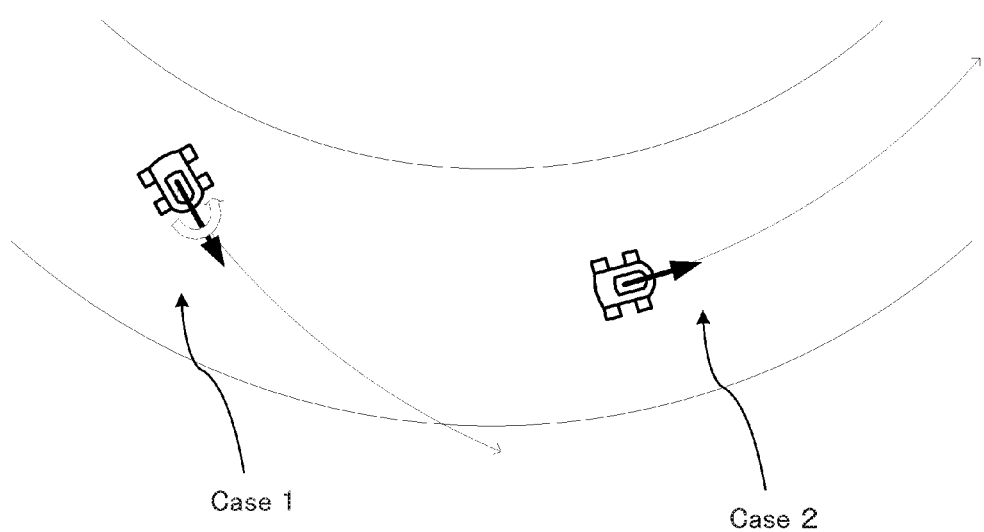
FIG. 28 is a non-limiting example diagram for describing a case where the predictive steering process is performed.

Here, with reference to FIG. 28, supplementary description is given of a case where the predictive steering process is performed and a case where the predictive steering process is not performed. In FIG. 28, a case is assumed in which the player is causing the own vehicle object 101 to pass through a curve while performing a steering wheel input (not intented to cause off-course). In this case, in the state shown in Case 1 of FIG. 28, occurrence of off-course is predicted, and thus, the predictive steering process is performed. As a result, a steering wheel input that directs the own vehicle object 101 toward the course inner side is applied, in addition to the steering wheel input value from the player. Meanwhile, in the case of Case 2 of FIG. 28, since occurrence of off-course is not predicted, the predictive steering process is not performed.

Figure 29:
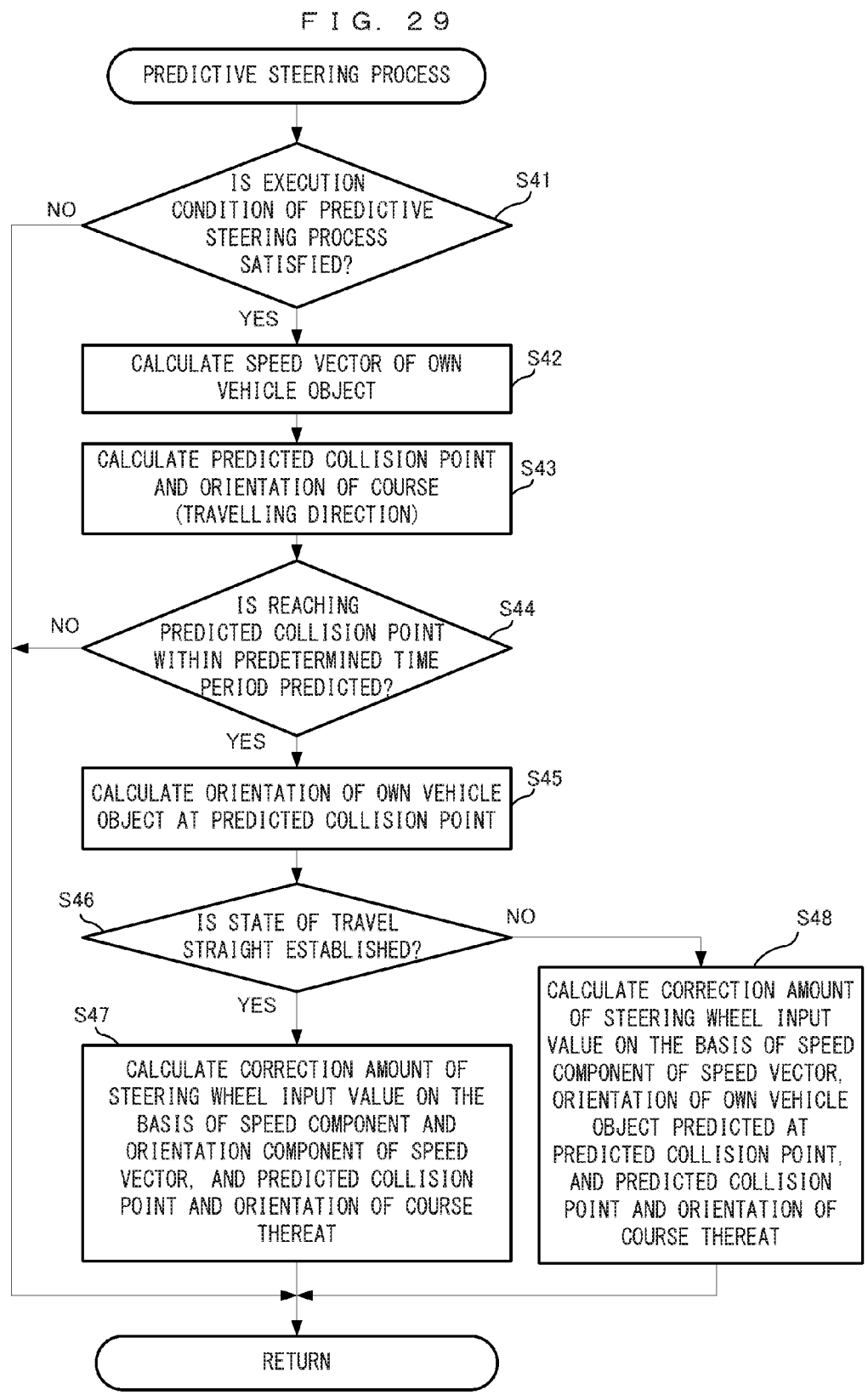
FIG. 29 is a non-limiting example flow chart showing details of the predictive steering process.

Next, a flow chart of the predictive steering process is shown in FIG. 29. With reference to FIG. 29, first, in step S41, the processor section 11 determines whether the execution condition of the predictive steering process as described above has been satisfied. If the execution condition has not been satisfied (NO in step S41), the predictive steering process ends. Meanwhile, if the execution condition has been satisfied (YES in step S41), the processor section 11 calculates the speed vector 452 of the own vehicle object 101 in step S42. In the next step S43, on the basis of the speed vector 452, the processor section 11 calculates the predicted collision point and the course edge orientation 462 indicative of the orientation of the course at the predicted collision point as described above.

Next, in step S44, the processor section 11 determines whether the own vehicle object 101 reaches the predicted collision point within a predetermined time period (i.e., whether off-course occurs). As a result, if the own vehicle object 101 does not reach the predicted collision point within the predetermined time period (NO in step S44), the predictive steering process ends (corresponding to Case 2 in FIG. 28 described above). Meanwhile, the own vehicle object 101 is predicted to reach the predicted collision point within the predetermined time period (YES in step S44), the processor section 11 calculates, in step S45, the orientation-at-collision 463 which is the orientation of the own vehicle object 101 at the predicted collision point.

Next, in step S46, the processor section 11 determines whether the own vehicle object 101 is traveling straight. As a result, if the own vehicle object 101 is traveling straight (YES in step S46), the processor section 11 calculates, in step S47, the correction amount of the steering wheel input value, on the basis of the speed component and orientation component of the speed vector 452 and the course edge orientation 462 at the predicted collision point described above. Meanwhile, if the own vehicle object 101 is not traveling straight (NO in step S46), the processor section 11 calculates, in step S48, the correction amount of the steering wheel input value, on the basis of the speed component of the speed vector 452, the orientation-at-collision 463, and the course edge orientation 462. Then, the predictive steering process ends.

[Basic Assistance Process]

Next, the basic assistance process is described. In this process, in such a case where the steering wheel input performed by the player is an input that directs the own vehicle object 101 toward the travelling direction of the course, the steering wheel input value is corrected so as to make the attitude of the own vehicle object 101 closer to an attitude along the travelling direction of the course. This process is performed when the following condition is satisfied. The first condition is the presence of a steering wheel input from the player, or the presence of a steering wheel input based on the off-course prevention process or on the predictive steering process (i.e., steering operation is being generated through the above-described correction even when the player is not performing steering operation). The second condition is that the steering wheel input has been made so as to direct the own vehicle object 101 forward (travelling direction, goal direction) of the course. It should be noted that the steering wheel input based on the off-course prevention process or the predictive steering process is an input that directs the own vehicle object 101 forward of the course, and thus, substantially, it is sufficient that whether the steering wheel input performed by the player is an input that directs the own vehicle object 101 forward of the course can be determined. The third condition is that the own vehicle object 101 is present at a position near the course edge to some extent. Specifically, the third condition corresponds to a case where the own vehicle object 101 is present to the left side relative to a threshold line 471A or to the right side relative to a threshold line 471B in FIG. 30 described next (the threshold line 471 is set so as to be shifted to the course inner side relative to that in the off-course prevention process). When these three conditions are all satisfied, the basic assistance process is performed.

Figure 30:
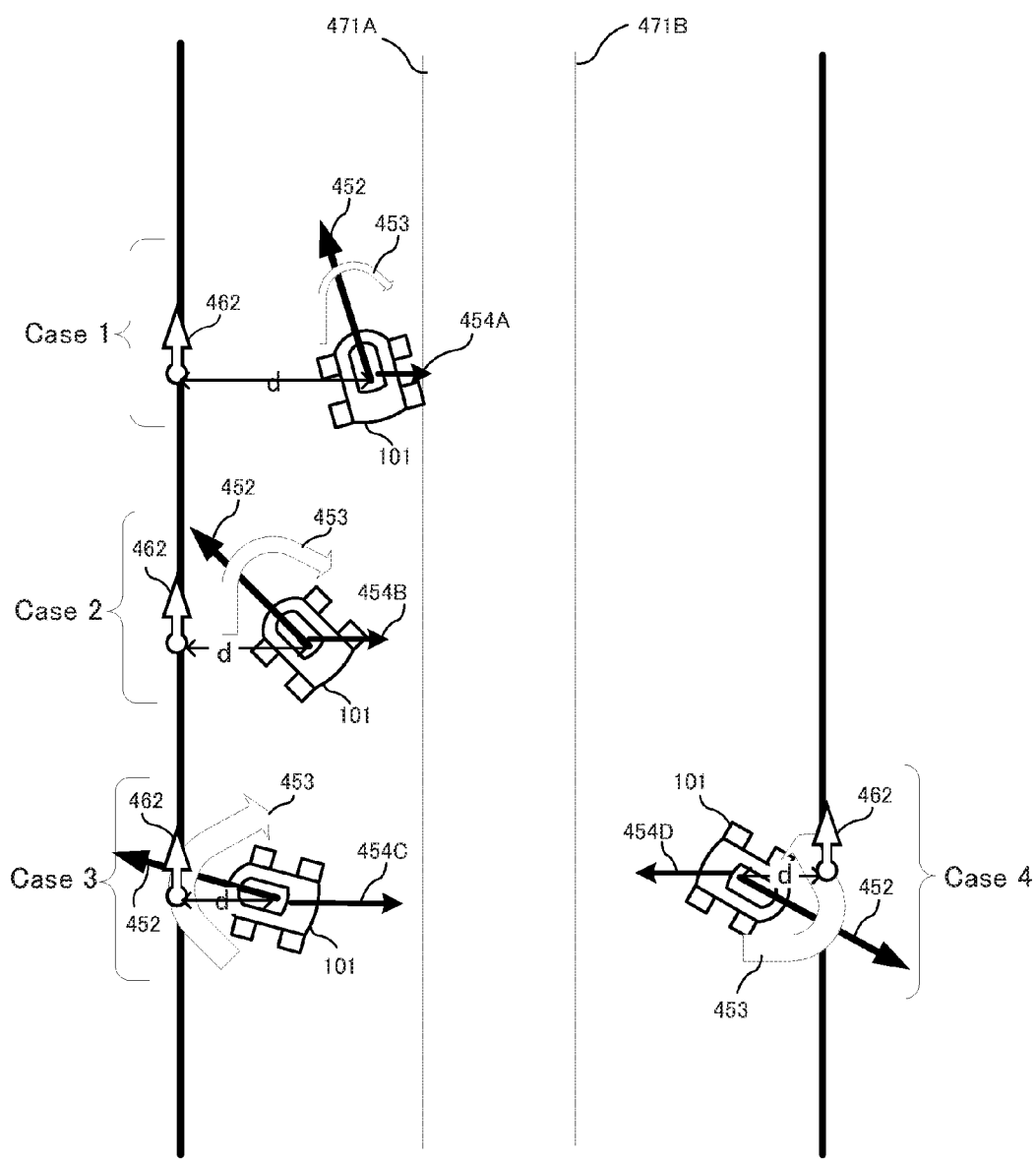
FIG. 30 is a non-limiting example diagram for describing the outline of a basic assistance process.

With reference to FIG. 30, the outline of the processes performed in the basic assistance process is described. FIG. 30 shows four Cases. In each of Cases 1 to 3, (at least a part of) the own vehicle object 101 is present to the left side relative to the threshold line 471A. In Case 4, (at least a part of) the own vehicle object 101 is present to the right side relative to the threshold line 471B. In the basic assistance process, first, the speed vector 452 of the own vehicle object 101 and the course edge orientation 462 of the course edge that is nearest to the own vehicle object 101 are calculated. Further, the distance d from the own vehicle object 101 to the course edge is also calculated. Then, on the basis of the steering wheel input value according to the input performed by the player, the distance d, the speed vector 452, and the course edge orientation 462, the correction amount 453 of the steering wheel input value, and a forced movement vector 454 similar to that in the off-course prevention process are calculated. In this process, with respect to the correction amount of the steering wheel input value, the direction in which to rotate the steering wheel (the orientation of the steering wheel) is not corrected here. Only with respect to the amount by which to rotate the steering wheel, a correction amount is calculated though, for example, multiplication by a predetermined multiplying factor. This is because, as described above, the presumption of this process is the presence of a steering wheel input that directs the own vehicle object 101 forward of the course, and there is no need to correct the orientation thereof.

The correction amount 453 of the steering wheel input value, and the magnitude of the forced movement vector 454 are calculated such that as the distance d becomes shorter, a stronger correction is made, accordingly. In FIG. 30, a greater correction amount is calculated in Case 2 than in Case 1. A greater correction amount is calculated in Case 3 than in Case 2.

In Case 4, the own vehicle object 101 has a slightly reversed orientation. In the off-course prevention process, an example has been shown in which, in a state similar to this case, a vector in a direction reverse to that of a speed vector is calculated as the forced movement vector. Meanwhile, in this basic assistance process, the orientation of the forced movement vector 454D is always in a direction perpendicular to the orientation of the course edge. This is because, in this process, not so strong correction as that in the off-course prevention process is made.

It should be noted that the basic assistance process and the off-course prevention process can be performed in an overlapping manner. Thus, the steering wheel input value could be corrected in some cases by the correction obtained through the off-course prevention process and the correction obtained through the basic assistance process being combined together.

Figure 31:
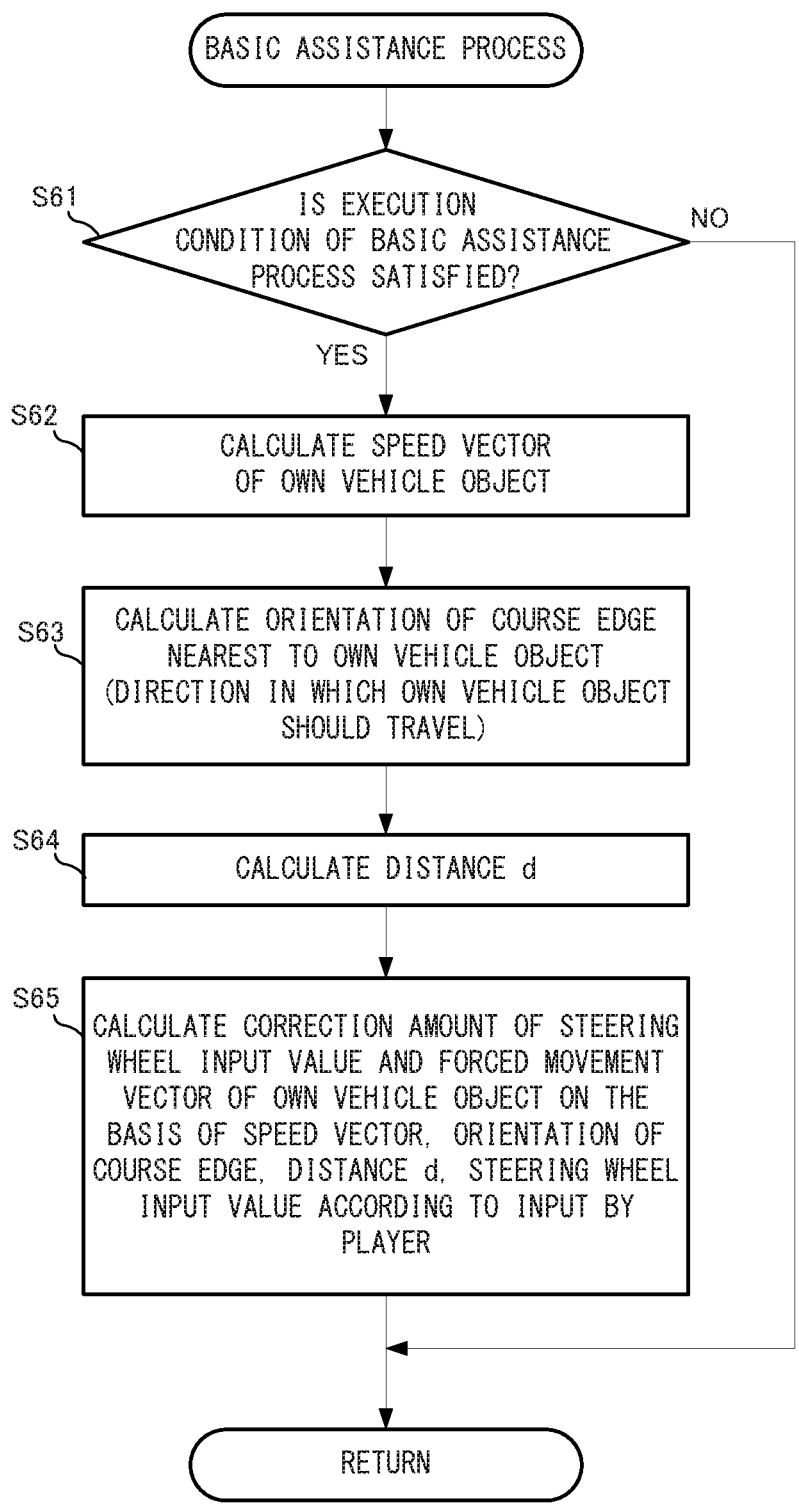
FIG. 31 is a non-limiting example flow chart showing details of the basic assistance process.

FIG. 31 shows a flow chart of the basic assistance process. With reference to FIG. 31, first, in step S61, the processor section 11 determines whether the execution condition of the basic assistance process as described above has been satisfied. If the execution condition has not been satisfied (NO in step S61), the basic assistance process ends. If the execution condition has been satisfied (YES in step S61), the processor section 11 calculates the speed vector 452 of the own vehicle object 101 in step S62. Further, in step S63, the processor section 11 calculates the course edge orientation 462 of the course edge that is nearest from the own vehicle object 101. Further, in step S64, the processor section 11 calculates the distance d from the own vehicle object 101 to the course edge. Then, in step S65, on the basis of the speed vector 452, the course edge orientation 462, the distance d, and the player steering wheel input value 309, the processor section 11 calculates the correction amount 453 of the steering wheel input value and the forced movement vector 454 of the own vehicle object. Then, the basic assistance process ends.

With reference back to FIG. 22, next, in step S27, the processor section 11 determines whether control for off-course prevention or control for predictive steering has been performed (in the current process loop). As a result, if such control has been performed (YES in step S27), the assistance process ends. Meanwhile, if neither of the controls has been performed (NO in step S27), the processor section 11 performs the course orientation alignment process in step S28. Then, the assistance process ends.

[Course Orientation Alignment Process]

Figure 32:
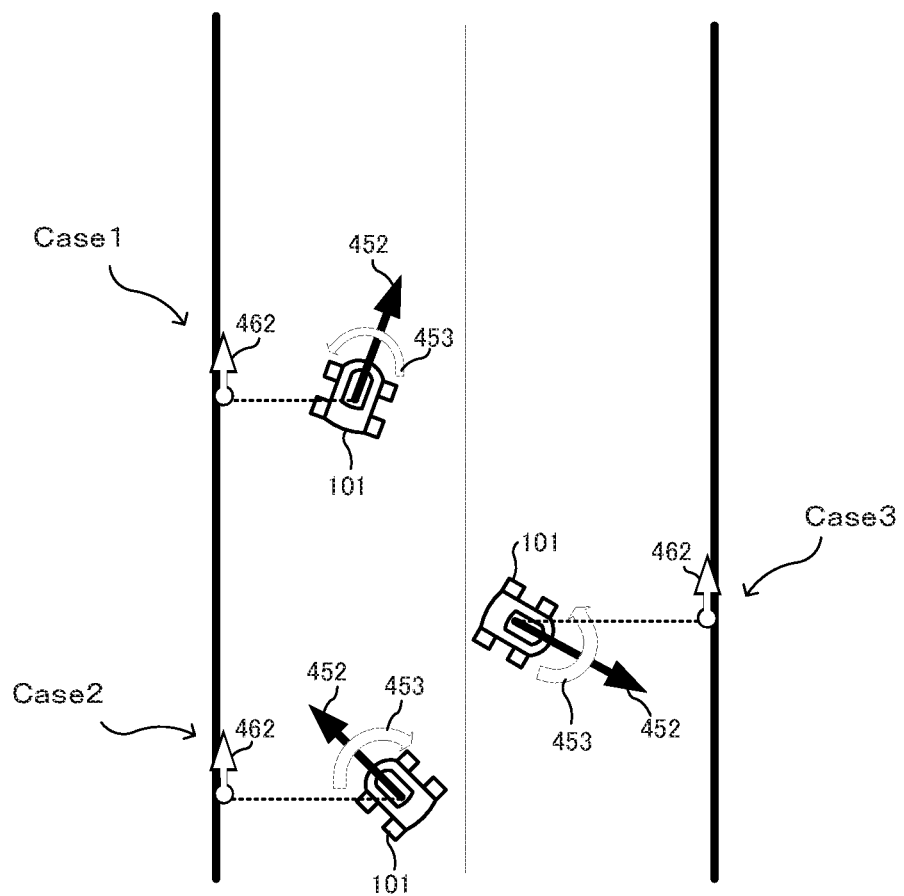
FIG. 32 is a non-limiting example diagram for describing the outline of a course orientation alignment process.

Next, with reference to FIG. 32, the outline of the course orientation alignment process is described. In this process, in a state where the risk of occurrence of off-course and the like is low, the steering wheel input value is corrected so as to allow the own vehicle object 101 to travel along the course as much as possible. The execution condition thereof is that the following three conditions are satisfied. The first condition is that, in the processes performed (in the current process loop), none of the assistance controls of the off-course prevention process, the predictive steering process, and the basic assistance process has been performed. The second condition is that the own vehicle object 101 is not in a drifting state. The third condition is the presence of a state in which the own vehicle object 101 is directed toward the outer side of the curve, or the presence of a state in which the own vehicle object 101 is directed toward the inner side of the curve and is predicted to collide with the course edge (i.e., go off the course).

In this process, the following processes are performed. First, calculation of the speed vector 452 of the own vehicle object 101 and calculation of the course edge orientation 462 that is nearest to the own vehicle object 101 are performed. Then, on the basis of the speed vector 452 and the course edge orientation 462, calculation of the correction amount 453 of the steering wheel input value is performed. Here, in this process, as the course edge orientation 462 and the orientation of the speed vector 452 are more deviated from each other (i.e., as the angle therebetween is greater), the correction amount 453 is calculated so as to be greater, accordingly; and as the course edge orientation 462 and the orientation of the speed vector 452 is closer to each other (as the angle therebetween is smaller), the correction amount 453 is calculated so as to be smaller, accordingly. In the example shown in FIG. 32, with respect to the course edge orientation 462 and the orientation of the speed vector 452 (i.e., the angle therebetween), the difference between the orientations is greater in Case 2 than in Case 1. Thus, the correction amount is calculated so as to have a greater value in Case 2 than in Case 1. Further, when Case 2 and Case 3 are compared with each other, the difference between the orientations is greater in Case 3 than in Case 2. Thus, the correction amount is calculated so as to have a greater value in Case 3 than in Case 2.

In this process, control of preferentially using the steering wheel input performed by the player is also performed. For example, in a case where a steering wheel input from the player has been detected, control in which the correction amount is reduced or no correction is performed is also performed.

Figure 33:
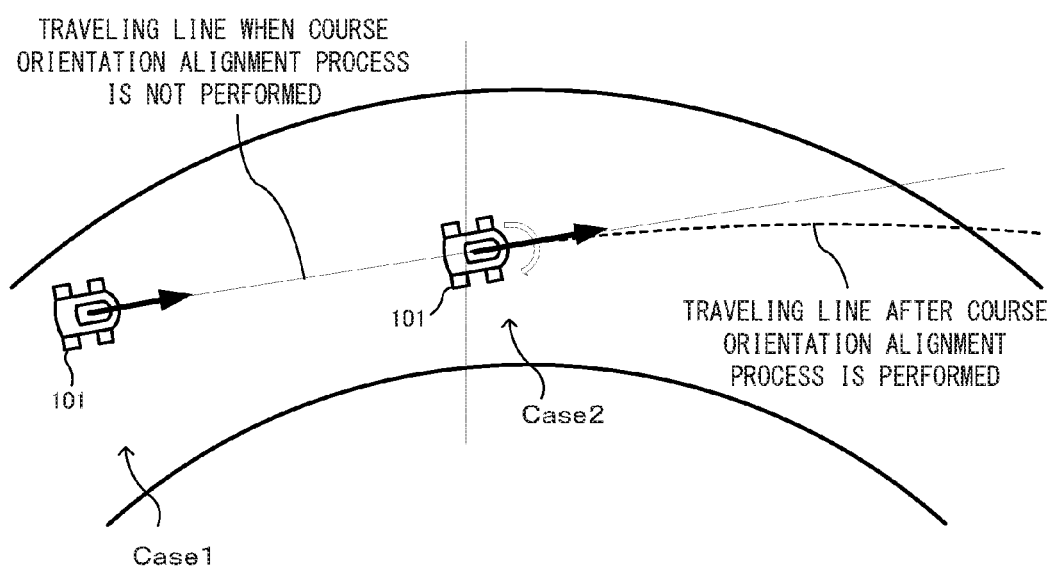
FIG. 33 is a non-limiting example diagram for describing the outline of the course orientation alignment process.

FIG. 33 shows another example of the course orientation alignment process. FIG. 33 shows one example of a case where the own vehicle object 101 passes a curve. First, in Case 1 shown in FIG. 33, the own vehicle object 101 is directed toward the inner side of the curve. In addition, in this state, there is no risk of the own vehicle object 101 colliding with the edge at the inner side of the curve. In this ease, the course orientation alignment process is not performed. Meanwhile, in Case 2, the state has changed such that the own vehicle object 101 is at a middle portion of the curve and is directed toward the outer side of the curve. When a state has established in which the own vehicle object 101 is directed toward the outer side of the curve in this manner, the course orientation alignment process is performed. As a result, the traveling line of the own vehicle object 101 is changed so as to be oriented slightly toward the inner side.

As described above, according to the course orientation alignment process, in a state where the other assistance processes have not been performed, and the steering wheel input performed by the player is preferentially used, a slight correction is made such that the orientation of the own vehicle object 101 becomes closer to a direction along the course orientation.

FIG. 34 shows a flow chart of the course orientation alignment process. With reference to FIG. 34, first, in step S71, the processor section 11 determines whether the execution condition of the course orientation alignment process as described above has been satisfied. As a result, if the execution condition has not been satisfied (NO in step S71), the course orientation alignment process ends. Meanwhile, if the execution condition has been satisfied (YES in step S71), the processor section 11 calculates the speed vector 452 of the own vehicle object 101 in step S72. Further, in step S73, the processor section 11 calculates the course edge orientation 462 that is nearest from the own vehicle object 101.

Next, in step S74, the processor section 11 refers to the operation data 302 and determines whether a steering wheel input by the player has been made. As a result, if the steering wheel input by the player has not been made (NO in step S74), the processor section 11 calculates, in step S75, a correction value of a steering wheel input on the basis of the orientation of the speed vector 452 and the course edge orientation 462. Meanwhile, if a steering wheel input by the player has been made (YES in step S74), the processor section 11 calculates, in step S76, a correction amount in consideration of the steering wheel input by the player. For example, a correction amount 453 is calculated so as to have a smaller value than the correction amount 453 calculated in the process of step S75. In another embodiment, 0 may be set as the correction amount, or alternatively, the process of step S76 may not be performed. Then, the course orientation alignment process ends.

With reference back to FIG. 16, when the assistance process has ended, the processor section 11 reflects, in step S7, the result of the assistance process and causes the own vehicle object 101 to move. That is, a process is performed in which the player steering wheel input value 309 is corrected by use of the correction amount calculated in the assistance process described above, and movement control of the own vehicle object 101 is performed by use of the corrected value. Then, the process is returned to step S2, to be repeated.

This is the end of the detailed description of the steering wheel assistance process according to the present embodiment.

As described above, in the present embodiment, a correction amount is calculated by use of the assistance process as described above, and the steering wheel input value inputted by the player is corrected. Then, by use of the corrected steering wheel input value, movement control of the own vehicle object 101 is performed. Accordingly, without giving the player an uncomfortable feeling with respect to the motion of the own vehicle object 101, it is possible to support the steering operation of the player. With the assistance process as described above, it is possible to support even a player poor at a race game such that the player can cause the own vehicle object 101 to travel well along the race course, whereby interest of the game can be enhanced.

Also with respect to the determination of the content of the correction described above, the correction amount is determined on the basis of the course edge as described above. Thus, appropriate correction is enabled, assuming a case where the player is likely to fail in causing the own vehicle object 101 to travel along the course, such as when off-course is likely to occur, or when, if the course edge is a wall, crash against the wall is likely to occur.

The control according to the steering wheel assistance process as described above is basically focused on avoidance of off-course (avoidance of collision with the course edge). However, in another embodiment, for example, in order to avoid collision with a predetermined object, the control process as described above may be applied. In this case, the process may be obtained by replacing the determination regarding collision (off-course) with the course edge in the process described above, with determination regarding collision with the predetermined object. In particular, as the matter that corresponds to the orientation (travelling direction, course edge orientation) of the course at the course edge in the process described above, a tangent which is at the predicted collision point with the predetermined object and which is the line at the travelling direction side of the course may be used. With respect to control to be performed, processes that correspond to the predictive steering process and the off-course prevention process described above may be performed.

Other than this, in a case of a competition race, the processes as described above may be applied. Here, in a case of a competition race, it is often difficult for a beginner to restore when the own vehicle object has crashed against a wall of the course from the front thereof. This could prevent the beginner from fully enjoying the competition. Thus, a control may be performed in which the wall of the course is detected by use of the processes as described above, and the own vehicle object is rotated without colliding with the wall of the course. Here, the own vehicle object may be rotated in the direction of the steering wheel input performed by the player at that time. If there is no steering wheel input performed by the player, the own vehicle object may be rotated in the direction of the steering wheel input that has been performed by the player before or at the previous time (last time). Then, after the own vehicle object is rotated up to the orientation at which the own vehicle object does not collide with the wall of the course, such a process may be ended.

In the examples described above, a case has been described in which the steering wheel input is an analog input made by means of the first analog stick 63. Other than this, for example, an input made by means of the cross key 65 may be used in the steering operation. In this case, since the input is a digital input, the player steering wheel input value 309 becomes any one of values of −1, 0, and +1. However, also in this case, the correction process as described above can be applied.

In the embodiment described above, with respect to the course edge calculation, the edge of the course at two paths of each of before and after the current position of the own vehicle object 101 is calculated in real time by use of the path data 306. Other than this, in another embodiment, with respect to the information indicative of the course edge, data may be provided in another form, without being limited to the form of the path data as described above. For example, edge data may be used in which coordinates of the course edge in the virtual space are listed. By use of such data, the position of the course edge may be determined, and determination of the off-course and calculation of the course edge orientation 462 and the like as described above may be performed.

In the examples described above, a race game is used. Other than this, for example, the processes described above can be applied to a driving game or the like that is not a race game. For example, the processes described above can be applied to a driving game in which a player sets a destination (corresponding to the goal of a race game) in a virtual space and causes an own vehicle object to travel in the virtual space.

In the embodiment described above, a case where a series of processes for correcting the steering wheel input value are performed in a single apparatus has been described. However, in another embodiment, the series of processes may be performed in an information processing system composed of a plurality of information processing apparatuses. For example, in an information processing system that includes a terminal side apparatus and a server side apparatus capable of communicating with the terminal side apparatus via a network, a pad of the series of processes may be performed by the server side apparatus. Alternatively, in an information processing system that includes a terminal side apparatus and a server side apparatus capable of communicating with the terminal side apparatus via a network, a main process of the series of processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

While this exemplary embodiment has been described in detail, the foregoing description is in all aspects illustrative and not restrictive. It is understood that numerous modifications and variations can be made without departing from the scope of this exemplary embodiment.

What is claimed is:

1. The computer-readable non-transitory storage medium having stored therein a game program to be executed by a computer of a game apparatus configured to perform game processing of moving, on the basis of an operation performed by a player, a predetermined object in a predetermined course in a virtual space, the game program causing the computer to perform:
    obtaining an input amount according to an input for controlling a moving direction of the predetermined object based on the operation performed by the player;
    performing correction control of the input amount according to the input for controlling the moving direction, so as to cause the moving direction of the predetermined object to be close to a direction along a travelling direction which is a direction toward a destination in the predetermined course, by increasing/decreasing a predetermined correction value which is added to the input amount, on the basis of relationship between a current moving direction of the predetermined object and the travelling direction of the course;
    controlling movement of the predetermined object in the virtual space on the basis of the corrected input amount according to the input for controlling the moving direction,
    obtaining edge data indicative of positions of both edges in a width direction axis of the course; and
    in the performing of the correction control, the travelling direction of the course is calculated on the basis of the edge data, and the correction value is determined on the basis of relationship between the calculated travelling direction and the current moving direction of the predetermined object,
    wherein in the performing of the correction control, the correction value is determined on the basis of a distance between the predetermined object and an edge, of both edges in the width direction axis of the course, that is nearer to the predetermined object.

2. The computer-readable non-transitory storage medium having stored therein a game program to be executed by a computer of a game apparatus configured to perform game processing of moving, on the basis of an operation performed by a player, a predetermined object in a predetermined course in a virtual space, the game program causing the computer to perform:
    obtaining an input amount according to an input for controlling a moving direction of the predetermined object based on the operation performed by the player;
    performing correction control of the input amount according to the input for controlling the moving direction, so as to cause the moving direction of the predetermined object to be close to a direction along a travelling direction which is a direction toward a destination in the predetermined course, by increasing/decreasing a predetermined correction value which is added to the input amount, on the basis of relationship between a current moving direction of the predetermined object and the travelling direction of the course;
    controlling movement of the predetermined object in the virtual space on the basis of the corrected input amount according to the input for controlling the moving direction,
    obtaining edge data indicative of positions of both edges in a width direction axis of the course; and
    in the performing of the correction control, the travelling direction of the course is calculated on the basis of the edge data, and the correction value is determined on the basis of relationship between the calculated travelling direction and the current moving direction of the predetermined object,
    wherein in the performing of the correction control, the correction value is determined on the basis of an angle between the moving direction of the predetermined object and the travelling direction at an edge, of both edges in the width direction axis of the course, that is nearer to the predetermined object.

3. The computer-readable non-transitory storage medium having stored therein a game program to be executed by a computer of a game apparatus configured to perform game processing of moving, on the basis of an operation performed by a player, a predetermined object in a predetermined course in a virtual space, the game program causing the computer to perform:
    obtaining an input amount according to an input for controlling a moving direction of the predetermined object based on the operation performed by the player;
    performing correction control of the input amount according to the input for controlling the moving direction, so as to cause the moving direction of the predetermined object to be close to a direction along a travelling direction which is a direction toward a destination in the predetermined course, by increasing/decreasing a predetermined correction value which is added to the input amount, on the basis of relationship between a current moving direction of the predetermined object and the travelling direction of the course;
    controlling movement of the predetermined object in the virtual space on the basis of the corrected input amount according to the input for controlling the moving direction, obtaining edge data indicative of positions of both edges in a width direction axis of the course; and in the performing of the correction control, the travelling direction of the course is calculated on the basis of the edge data, and the correction value is determined on the basis of relationship between the calculated travelling direction and the current moving direction of the predetermined object, wherein the game program further causes the computer to perform further applying, to the predetermined object, an acceleration toward an inner side direction of the course and in a direction perpendicular to the travelling direction according to an edge, of both edges in the width direction axis of the course, that is nearer to the predetermined object, and in the controlling of the movement, the movement of the predetermined object is controlled on the basis of the corrected input amount according to the input for controlling the moving direction and the applied acceleration.

4. The computer-readable non-transitory storage medium having stored therein the game program according to claim 3, wherein in the applying of the acceleration, a magnitude of the acceleration to be applied to the predetermined object is determined in accordance with a distance between the predetermined object and the edge that is nearer to the predetermined object.

5. The computer-readable non-transitory storage medium having stored therein a game program to be executed by a computer of a game apparatus configured to perform game processing of moving, on the basis of an operation performed by a player, a predetermined object in a predetermined course in a virtual space, the game program causing the computer to perform;

obtaining an input amount according to an input for controlling a moving direction of the predetermined object based on the operation performed by the player;

performing correction control of the input amount according to the input for controlling the moving direction, so as to cause the moving direction of the predetermined object to be close to a direction along a travelling direction which is a direction toward a destination in the predetermined course, by increasing/decreasing a predetermined correction value which is added to the input amount, on the basis of relationship between a current moving direction of the predetermined object and the travelling direction of the course; and controlling movement of the predetermined object in the virtual space on the basis of the corrected input amount according to the input for controlling the moving direction, wherein the correction control is performed when the predetermined object is present in a predetermined range from either one of both edges in a width direction axis of the course.

* * * * *